(12) United States Patent  (10) Patent No.: US 7,960,659 B2
Cleary  (45) Date of Patent: Jun. 14, 2011

(54) TRAILER TONGUE WEIGHT MEASUREMENT SYSTEM

(76) Inventor: Michael M. Cleary, Carpinteria, CA (US)

( * ) Notice: Subject to any disclaimer, the term of this patent is extended or adjusted under 35 U.S.C. 154(b) by 351 days.

(21) Appl. No.: 12/260,142

(22) Filed: Oct. 29, 2008

(65) Prior Publication Data

US 2009/0107735 A1    Apr. 30, 2009

Related U.S. Application Data

(60) Provisional application No. 60/983,624, filed on Oct. 30, 2007.

(51) Int. Cl.
*G01G 19/02* (2006.01)
*G01G 19/08* (2006.01)
*G01G 3/00* (2006.01)

(52) U.S. Cl. ........ 177/136; 177/146; 177/225; 280/489; 116/28 R

(58) Field of Classification Search ............. 280/489; 177/136, 145, 146, 225–233; 116/28 R
See application file for complete search history.

(56) References Cited

U.S. PATENT DOCUMENTS

| | | | | |
|---|---|---|---|---|
| 306,581 | A * | 10/1884 | Chase | 177/146 |
| 522,993 | A * | 7/1894 | Lobee | 177/146 |
| 1,368,854 | A * | 2/1921 | Steele | 177/146 |
| 2,970,820 | A | 2/1961 | Sepich | |
| 3,695,213 | A * | 10/1972 | Littlefield | 116/28 R |
| 3,700,053 | A | 10/1972 | Glissendorf | |
| 3,797,594 | A | 3/1974 | Chaffee | |
| 4,056,155 | A | 11/1977 | Wahl | |
| 4,706,768 | A | 11/1987 | Kozozian et al. | |
| 5,927,742 | A | 7/1999 | Draper | |
| 6,102,437 | A | 8/2000 | McLane | |
| 6,206,401 | B1 | 3/2001 | Osterback | |
| 6,722,684 | B1 | 4/2004 | McAllister | |
| 6,840,541 | B2 | 1/2005 | Walters | |
| 2006/0032679 | A1 * | 2/2006 | Wilson et al. | 177/136 |

OTHER PUBLICATIONS

Common Weight Distribution and Sway Control Questions; www.etrailer.com/faq-weightdistribution.aspx, pp. 1-8 (no publication date available).
Sherline Trailer Tongue Weight Scale: Simple scale makes trailering safer; http://www.sherline.conn/lm.htm, pp. 1-5, Sherline Products, Inc., Vista, CA., 2000.
Sherline Trailer Tongue Weight Measuring System, Instructions for Use and Trailer Loading and Towing Guide, pp. 1-16, Sherline Products, Inc., Vista, CA., 2000.
Int'l. Search Report, PCTUS08081666, Apr. 17, 2009.

* cited by examiner

*Primary Examiner* — Randy W Gibson
(74) *Attorney, Agent, or Firm* — Pepper Hamilton LLP

(57) ABSTRACT

A trailer tongue weight measurement system is provided to ensure proper loading and safe handling of a trailer being towed by a vehicle. The weight measurement system includes a two part or split housing having a operating shaft, a spring and a scale. The weight measurement system may be incorporated into the trailer tongue, the tongue jack, or the hitch. Deflection of the spring in response to a load on the trailer is converted to a weight measurement that may be read on a calibrated scale.

48 Claims, 13 Drawing Sheets

TRAILER TONGUE WEIGHT MEASUREMENT SYSTEM

CROSS-REFERENCE TO RELATED APPLICATIONS

This application claims priority to U.S. provisional application Ser. No. 60/983,624 filed Oct. 30, 2007, which is incorporated herein by reference in its entirety.

TECHNOLOGY FIELD

The present invention relates generally to a trailer safety system, and more particularly to safety systems and methods for measuring the weight on the tongue of a trailer. This technology is particularly suited, but by no means limited, for use with trailers designed to be towed behind a motor vehicle.

BACKGROUND

In the use of typical automotive utility trailers such as boat, cargo, camping, horse, race car, or work trailers it is critical for safe towing to have the proper distribution of weight between the hitch on the towing vehicle and the axle[s] of the trailer. If the weight on the hitch is too small, the trailer will shimmy and sway possibly causing loss of control and an accident. If the weight is too high on the hitch, then the rear of the tow vehicle is over loaded and the steering wheels and brakes are less effective, which will lead to control and stopping problems. Proper trailer loading and weight distribution helps ensure proper and safe trailer handling.

At the present time there are no convenient and accurate ways for a user to determine whether the trailer is properly loaded. For example, one conventional way to measure this weight distribution is for the user to guesstimate it themselves. This is particularly true in the case of all rental style cargo trailers where untrained people who are not familiar with the requirements of towing are doing the loading. Even in the case of travel and boat trailers where the manufacturer has provided the trailer and properly balanced it, the user can upset that balance by how they load additional equipment into the boat or trailer.

Another conventional means for obtaining the tongue weight on trailers is a separate weight scale that may be placed under the trailer tongue. One example includes the Sherline Trailer Tongue Weight Scale (see. e.g., http://www-.sherline.com/lm.htm). The Sherline scale uses a hydraulic principle to convert weight into a direct reading on a hydraulic pressure gauge.

An accurate measurement of tongue weight may be achieved by measuring right where the hitch actually rests on the ball or alternatively at the tongue jack. The Sherline scale uses an extension that screws into the top of the cylinder so that the trailer hitch may be supported. The Sherline scale teaches that it is best practice to measure the hitch weight with the trailer level (trailer wheels blocked to prevent movement) and the hitch at the approximate height it will be when installed on the tow vehicle.

The trailer tongue may be supported with the tongue jack. Blocks are required to be used with the Sherline scale to block the Sherline scale into position under the hitch. The Sherline scale teaches that, alternatively, a hydraulic floor jack may be used and the Sherline scale may be placed on the jack and jacked into position. The tongue jack may be raised until the full weight of the hitch is on the Sherline scale and the weight in pounds may be read directly from the gauge on the Sherline scale.

As such the Sherline scale suffers from the drawbacks that it is a standalone device that must be separately carried around and also from the fact that separate and ancillary devices (e.g., wood blocks or a hydraulic floor jack) are required to properly place and use the Sherline scale.

Thus, there is a need for a trailer weight measurement system that is accurate and easy to use. What is needed is a simple and effective means for determining whether a trailer is properly loaded for safe handling when being towed by a tow vehicle. What is needed is a simple and effective means of determining the weight on the trailer tongue without having to carry and use separate devices.

SUMMARY

Embodiments of the present invention are directed to a trailer weight measurement system including a split housing, wherein one part of the split housing may move relative to another part of the split housing. A shaft may be rotatably disposed within the housing. The shaft may include a non-threaded portion and a threaded portion. A distal end of the non-threaded portion of the shaft extends through a shaft opening in one part of the split housing. The threaded portion of the shaft may be threaded into a threaded hole in the other part of the split housing. The shaft may include a shoulder separating the non-threaded portion and the threaded portion. A spring may be located within the split housing and positioned concentrically around the shaft between the shaft shoulder and a surface of one part of the split housing. A handle may be located external to the split housing and connected to the distal end of the shaft. The weight measurement system includes a scale having a zero point and a series of indicators corresponding to a weight being measured by the weight measurement system.

In one embodiment, the split housing includes a tongue jack unit having a tube-like housing comprising a main housing and a jack housing. The jack housing may be slidably disposed within the main housing and may extend through an open bottom end of the main housing.

In this embodiment, the main housing further includes a top end having a shaft opening, an open bottom end, and a side wall extending between the top end and the open bottom end. In this embodiment, the jack housing further includes a top end, a threaded hole in a center of the top end, a bottom end, and a foot plate at the bottom end of the jack housing for engaging a support surface, such as the ground.

In this embodiment, a shaft extends between the main housing and the jack housing. The shaft further includes a distal end of the non-threaded portion that may extend through the shaft opening in the top end of the main housing. The threaded portion of the shaft may be threaded into the threaded hole in the top end of the jack housing.

A thrust bearing may be disposed concentrically about the non-threaded portion of the shaft. A first side of the thrust bearing may contact the shaft shoulder. A spring may be disposed concentrically about the non-threaded portion of the shaft. A first end of the spring may contact a second side of the thrust bearing and a second end of the spring may contact an inside surface of the top end of the main housing. The spring acts to urge the main housing and the jack housing apart. In some embodiments, the spring may be a coil spring.

According to another aspect of the invention, a crank shaft may be connected to the non-threaded portion of the shaft extending through the opening in the top end of the main housing. Rotation of the crank shaft may cause rotation of the shaft and sliding movement of the jack housing relative to the main housing. The crank handle may be used to raise and lower the tongue jack.

According to another aspect of the invention, a scale may be located on the non-threaded portion of the shaft proximate the shaft opening. The scale may include a zero point and a series of indicators corresponding to a weight being measured by the weight measurement system.

According to another aspect of the invention, the weight measurement system may be calibrated so that the zero point of the scale is at the shaft opening with no load on the system. When a load is applied, the spring compresses and the shaft may move upward out through the shaft opening thereby revealing the series of indicators on the scale on the shaft.

According to another embodiment of the invention, a gear housing may be slidably disposed over the top end of the main housing and the distal end of the shaft. The gear housing may include a right angle gear set connected to the non-threaded portion of the shaft extending through the shaft opening. The gear set may provide for transitioning the shaft output 90 degrees (e.g., from substantially vertical to substantially horizontal). An upper portion of the gear housing may extend above the main housing and enclose the gear set. A lower portion of the gear housing may extend over and about an upper portion of the main housing to a lower edge.

In this embodiment, the scale may be located on an upper portion of the main housing. The weight measurement system may be calibrated so that the zero point of the scale is at the lower edge of the gear housing with no load on the system. When a load is applied to the system, the spring compresses and the shaft and gear housing move upward with the shaft thereby revealing the series of indicators on the scale on the main housing.

According to another embodiment of the invention, the trailer weight measurement system may include a gage read out for amplifying the spring deflection to make it easier to read. The gage read out may include a gage housing disposed over the top end of the main housing where the shaft extends through the gage housing. A circular gear rack may be formed on the portion of the shaft extending through the gage housing and a pinion gear may engage the circular gear rack. A shaft may extend from the pinion gear through an opening in the gage housing to an exterior of the gage housing. An indicator needle may be connected to the shaft and may extend over the scale formed on an exterior surface of the gage housing. The gage read out for amplifying the spring deflection may be used for heavier trailer loads.

According to some embodiments of the invention, the weight measurement system may be retrofit into an existing trailer tongue jack by replacing at least the shaft and adding the spring. In another embodiment, the thrust bearing may also be added. According to some embodiments of the invention, the weight measurement system may be formed integral with a new trailer tongue jack. According to some embodiments of the invention, the weight measurement system may be formed as a replacement part and may be retrofitted onto an existing trailer.

According to another aspect of the invention, a crank shaft may be connected to the gear set, the crank shaft having a horizontal output. Rotation of the crank shaft may cause rotation of the shaft and sliding movement of the jack housing and gear housing relative to the main housing.

According to another aspect of the invention, the trailer tongue weight measurement system may be calibrated such that, in an unloaded condition, the zero point on the scale is located at the bottom edge of the gear housing.

According to another embodiment of the invention, the trailer tongue weight measurement system may comprise a trailer tongue or coupler unit—i.e., the trailer tongue weight measurement system that is connected to or formed integral with the trailer tongue or coupler. In this embodiment, the trailer tongue weight measurement system includes a first plate connected to the ball receptacle and a second plate connected to the tongue coupler. A pivot pin may pivotally connect the first plate and the second plate proximate a bottom edge of the first and second plates.

In this embodiment, the a first plate includes: a shaft opening located proximate a center of the first plate; and one or more threaded holes. The second plate includes: a shaft opening located proximate a center of the second plate, wherein the shaft opening in the second plate corresponds in location (i.e., is in-line) to the shaft opening in the first plate; a threaded hole concentric with the shaft opening of the second plate; one or more through holes, wherein the through holes on the second plate correspond in number and location to the one or more threaded holes on the first plate.

In this embodiment, one or more shoulder bolts may be inserted through one of the through holes in the second plate and threaded into one of the threaded holes in the first plate. Each shoulder bolt may include a head, a shoulder, and a threaded shaft.

One or more clearance indicators may be disposed between the first plate and the second plate. Each clearance indicator may include an opening surrounded by a body portion. A shoulder bolt may be inserted through the opening in the clearance indicator.

A shaft may be rotatably disposed between the first plate and the second plate. In this embodiment, the shaft includes: a non-threaded portion that extends through the shaft opening in the first plate; a threaded portion that is threaded into the threaded hole in the second plate; a shoulder between the non-threaded portion and the threaded portion of the shaft.

A spring may be disposed concentrically about the non-threaded portion of the shaft. In this embodiment, a first end of the spring may contact a rear surface of the first plate and a second end of the spring may contact the shaft shoulder. The spring acts to urge the plates apart. The spring may include one or more spring washers.

A scale may be located on a rear surface of the second plate (or whatever side the shaft extends out of). The scale may include a zero point and a series of indicators corresponding to a weight being measured by the weight measurement system.

According to another embodiment of the invention, the trailer tongue weight measurement system may comprise a trailer hitch unit—i.e., the trailer tongue weight measurement system that is connected to or formed integral with the trailer hitch. In this embodiment, the trailer tongue weight measurement system includes a first plate connected to the ball and a second plate connected to the hitch tubing. A pivot pin may pivotally connect the first plate and the second plate proximate a bottom edge of the first and second plates.

In this embodiment, the first plate may include: a shaft opening located proximate a center of the first plate; a threaded hole concentric with the shaft opening; and one or more threaded holes. The second plate may include: a shaft opening located proximate a center of the second plate, wherein the shaft opening in the second plate corresponds in location (i.e., it in-line) to the shaft opening in the first plate; one or more through holes, wherein the through holes on the second plate correspond in number and location to the one or more threaded holes on the first plate.

In this embodiment, one or more shoulder bolts may be inserted through one of the through hole in the second plate and threaded into one of the threaded holes in the first plate. Each shoulder bolt may include a head, a shoulder, and a threaded shaft.

One or more clearance indicators may be disposed between the first plate and the second plate. Each clearance indicator may include an opening surrounded by a body portion. A shoulder bolt may be inserted through the opening in the clearance indicator.

A shaft may be rotatably disposed between the first plate and the second plate. In this embodiment, the shaft includes: a non-threaded portion that extends through the shaft opening in the second plate; a threaded portion that is threaded into the threaded hole in the first plate; and a shoulder between the non-threaded portion and the threaded portion of the shaft.

A spring may be disposed concentrically about the non-threaded portion of the shaft. In this embodiment, a first end of the spring may contact a front surface of the second plate and a second end of the spring may contact the shaft shoulder. The spring acts to urge the plates apart. The spring may include one or more spring washers.

A scale may be located on a rear surface of the second plate. The scale having a zero point and a series of indicators corresponding to a weight being measured by the weight measurement system.

According to another aspect of the invention, the shaft may include a spindle portion and a second threaded portion. A handle may be disposed over and may engage the spindle portion of the shaft. A nut may be threaded onto the second threaded portion of the shaft to secure the handle in place.

According to another aspect of the invention, the handle may be placed on the shaft and over the zero point of the scale when the trailer weight measurement system is unloaded. In a loaded condition, the handle may be rotated by a user until the one or more clearance indicators are free to move. At this time, a weight measured by the trailer weight measurement system may be read from the scale based on the position of the handle over the scale.

According to another aspect of the invention, the clearance indicators may include double action stirrup clearance indicators. When the handle is rotated too far, the double action stirrup clearance indicators will be restrained by a clamping action between a head of the shoulder bolt and the second plate to help assure a proper weight is read on the scale.

According to another aspect of the invention, the one or more clearance indicators may include stirrup type indicators. Each stirrup indicator may include a U-shape body portion having two washer portions and an opening in each washer portion. The U-shape body portion may surround a top edge of the second plate and the shoulder bolt may pass through the opening in each washer portion.

According the another aspect of the invention, a handle may be connected to the shaft and may be located over the scale. Rotation of the handle causes rotation of the shaft and either compression or release of the spring.

According the another aspect of the invention, the trailer tongue weight measurement system may be calibrated such that in a loaded condition, the zero point on the scale is located under the handle and the handle is rotated until the one or more clearance indicators are free to move. The position of the handle over the scale when the clearance indicators are free to move indicating the weight on the trailer tongue.

The scale may include a variety of forms, including numerical, color, symbols, and the like.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings embodiments that are presently preferred, it being understood, however, that the invention is not limited to the specific instrumentalities disclosed. In the drawings.

DETAILED DESCRIPTION OF ILLUSTRATIVE EMBODIMENTS

Figure 1A:
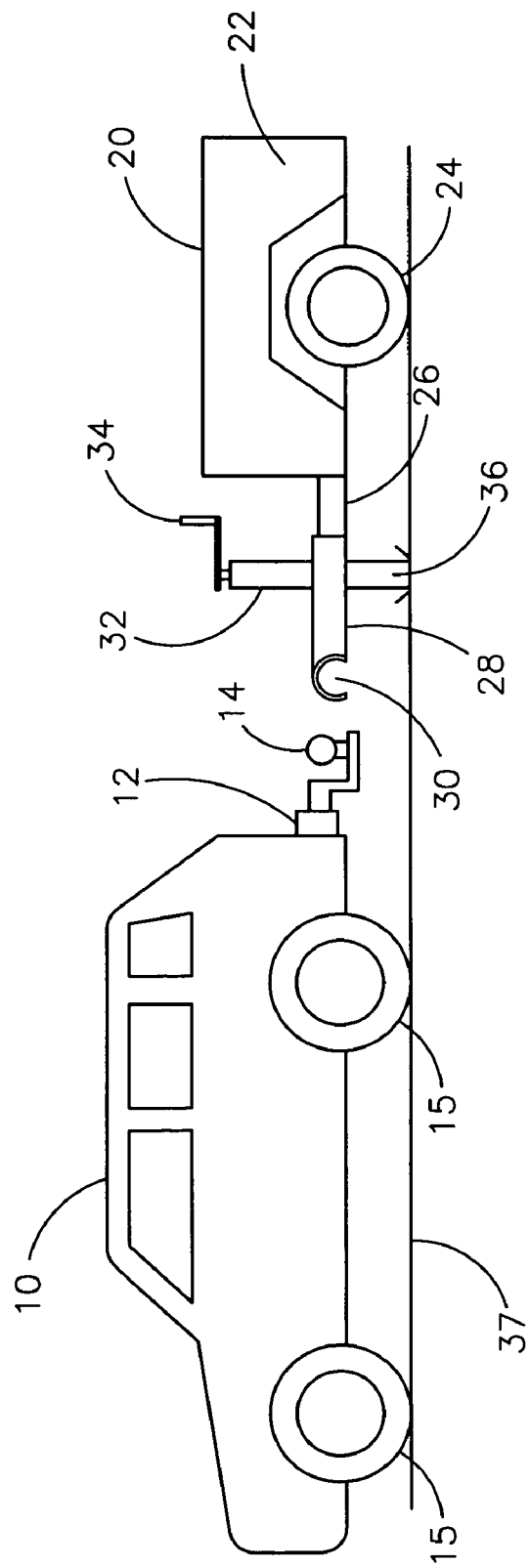
FIGS. 1A and 1B are a side view of an exemplary tow vehicle and trailer.

The present invention is directed to embodiments of trailer tongue weight measurement systems and methods that overcome the shortcomings of conventional methods of trying to determine a trailer's tongue weight—e.g., user's guesstimating the trailer tongue weight and also conventional stand-alone trailer tongue weight scales. The trailer tongue weight measurement systems and methods disclosed herein may be used, for example, for the safe loading and proper handling of trailers being towed by a tow vehicle. The weight measurement system may be formed integral with the trailer or hitch to determine the weight on the trailer tongue for proper loading and safety in trailer towing. The trailer tongue weight measurement systems and methods provide a versatile system of measuring the tongue weight which may be universally adaptable to the needs of the trailer industry and user group. Embodiments of the trailer tongue weight measurement systems and methods integrate a simple spring scale device to measure the tongue weight of the loaded trailer. As used herein, the term trailer includes typical automotive utility trailers such as, for example: boat, cargo, camping, horse, race car, work, and the like. The different embodiments disclosed herein may be desirable to suit the different requirements of the various trailer constituencies including, for example: manufacturer, owner, user, Rental Company, an owner of multiple trailers, and the like.

Embodiments of the trailer weight measurement system may include a two part or split housing having a integral spring and scale. The two parts or split housing may move relative to one another in response to a load on the trailer ball and compress the spring. The deflection of the spring may be converted to a weight on the trailer using the scale. Preferably, the trailer weight measurement system is located at or proximate the trailer ball or tongue jack.

In one embodiment, the trailer tongue weight measurement system comprises a tongue jack having a main housing and jack housing that may move relative to one another and an integral spring disposed concentrically about a shaft disposed within the housings to urge the main housing and the jack housing apart. A scale may be provided integral with the tongue jack weight measurement system to convert the deflection of the spring resulting from the trailer load to a weight measurement. In another embodiment, the trailer tongue weight measurement system comprises a hinge plate assembly having two plates and an integral spring disposed concentrically about a shaft extending between the plate to urge the plates apart. A scale may be provided integral with the weight measurement system to convert the load on the spring resulting from a spring loading device to a weight measurement. In one embodiment, the trailer weight measurement system is on the trailer coupler. In another embodiment, the trailer weight measurement system is on the hitch. One advantage of the trailer tongue weight measurement systems and methods disclosed herein are that they are integral, meaning that a separate scale does not have to be carried and used, and ancillary devices, such as blocks or a floor jack are not required.

Other benefits and advantages of a tongue jack weight measurement unit include: it may mount on any standard trailer; it is inexpensive to manufacture and maintain; it is easy to use; it is accurate; it includes a versatile jack design and may be used when the trailer is connected or disconnected from the tow vehicle; it may cover a relatively large weight span; etc. Other benefits and advantages of a trailer coupler or tongue weight measurement unit include: it may be built into the trailer; it is inexpensive to manufacture and maintain; it is easy to use; it is accurate; no un-hitching of the trailer is required; etc. Other benefits and advantages of a hitch weight measurement unit include: it may be built into the hitch; it is inexpensive to manufacture and maintain; it is easy to use; it is accurate; no un-hitching of the trailer is required; one hitch unit may be used for multiple trailers; etc.

Figure 1B:
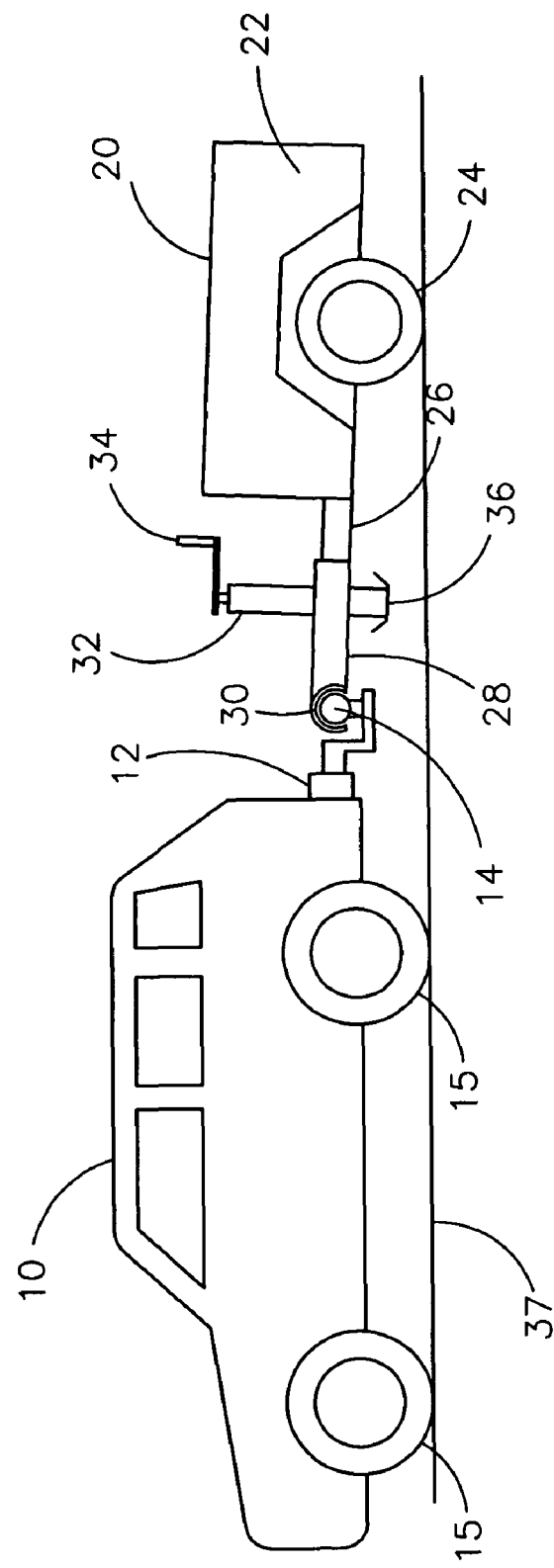

FIGS. 1A and 1B show an exemplary tow vehicle 10 and trailer 20. As shown in FIGS. 1A and 1B, the tow vehicle 10 may include a hitch 12 and a ball and ball mount 14 at the rear of the tow vehicle 10. The tow vehicle 10 may include any motor vehicle suitable for towing a trailer 20. As shown, the tow vehicle 10 may include an automobile having front and rear axles/wheels 15.

As shown in FIGS. 1A and 1B, the trailer 20 may include a compartment 22 for holding goods and one or more axles/wheels 24. The trailer 20 may also include a trailer tongue 26 and a tongue jack 32. As shown, the trailer tongue may include a coupler 28 and a ball receptacle 30. The ball receptacle 30 may be designed and constructed to fit over the ball mount 14 of the hitch 12 on the tow vehicle 10. As shown, the tongue jack 32 may include a handle 34 for activating the tongue jack 32 to raise or lower the trailer tongue 26 and a footplate 36 for engaging a support surface 37, such as the ground. As shown in FIG. 1A, the tongue jack 32 is in a lowered position and the trailer 20 is not connected to the tow vehicle 10. As shown in FIG. 1B, the tongue jack 32 is in a raised position and the trailer 20 is connected to the tow vehicle 10. Safety chains (not shown) may be used as a back-up system between the tow vehicle 10 and the trailer 20.

The hitch 12 and ball 14 should be selected based on the expected load of the trailer 20. Preferably, the hitch 12 and/or ball 14 are removable from the vehicle and the properly rated hitch/ball may be used to tow the expected load of the trailer. The ball 14 is typically rated by its towing capacity. The hitch 12 is typically rated not only by its towing capacity, but also by the tongue weight.

Figure 2:
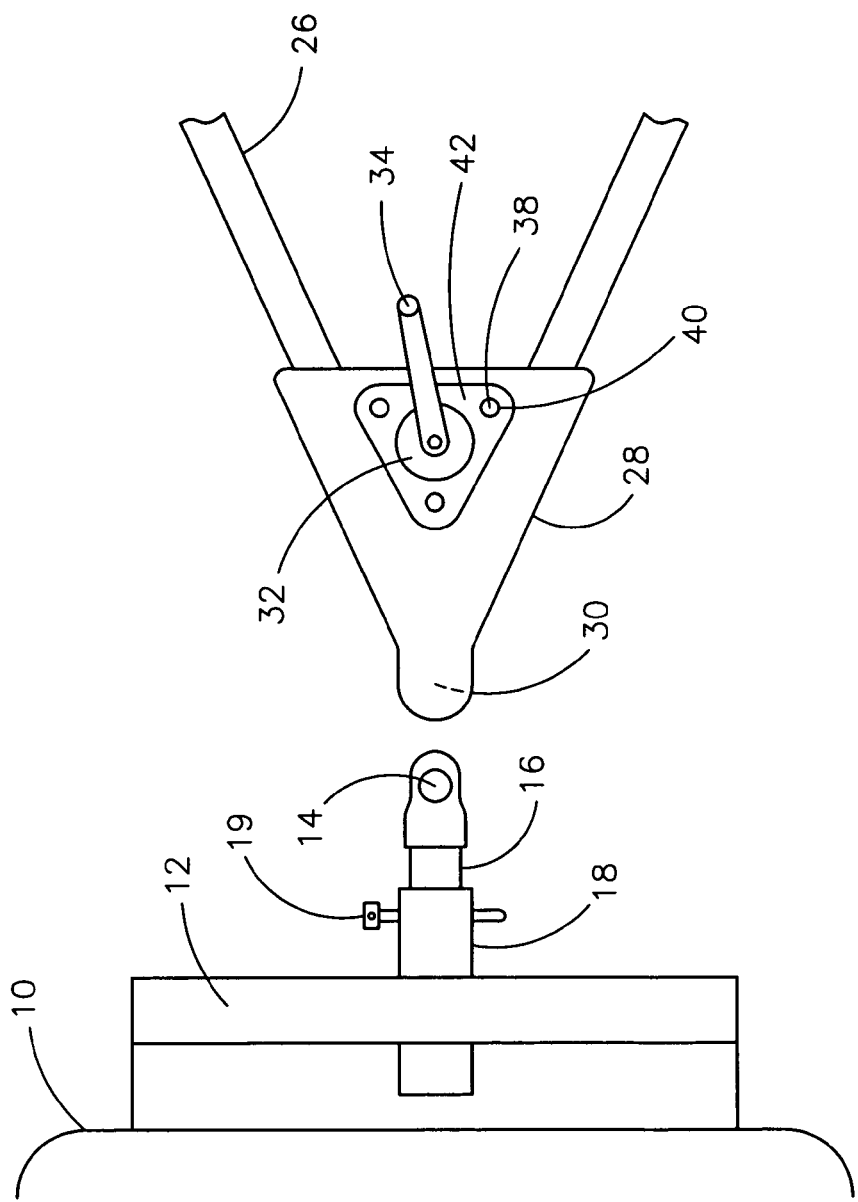
FIG. 2 is a top view showing an exemplary hitch on a tow vehicle and coupler on a trailer.

FIG. 2 is a top view of the exemplary tow vehicle and trailer 20 of FIG. 1A. As shown in FIG. 2, the hitch 12 and ball 14 may be connected to the tow vehicle 10. As shown, the hitch 12 may include square tubing 16 which telescopes into the receiver 18 on the hitch 12 and may be held in position by a pin 19 (see e.g., FIG. 7A).

The trailer tongue 26, coupler 28, and ball receptacle 30 are also shown in FIG. 2. As shown, the tongue jack 32 may be connected to the coupler 28 of the trailer tongue 26 using, for example, bolts 38 that extend through holes 40 in plate 42.

Figure 3:
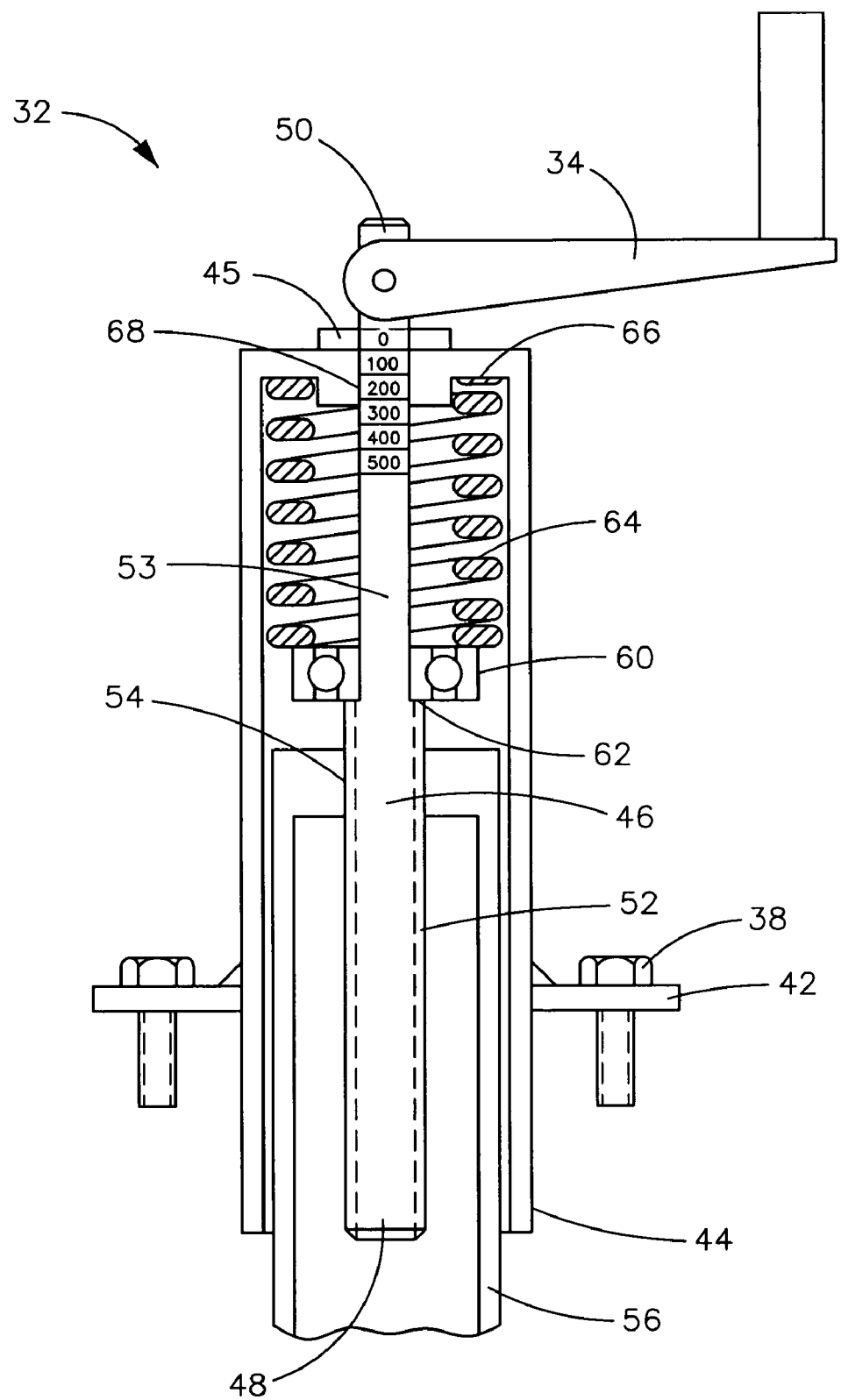
FIG. 3 is a side sectional view of the exemplary tongue weight measurement system incorporated in to an exemplary trailer jack.

FIG. 3 shows one exemplary embodiment of the trailer tongue weight measurement system. As shown in FIG. 3, the trailer tongue weight measurement system may include a modification to a standard trailer tongue jack. This modification may be designed into a new tongue jack or retrofitted into an existing tongue jack. Essentially all trailers have a tongue jack 32 that allows a user to lift the trailer tongue 26 high enough so that the ball 14 of the tow vehicle 10 may be positioned below the trailer ball receptacle 30. Accordingly, the tongue jack unit may be used on any standard trailer, either as a new or retrofit unit.

As shown, the trailer tongue weight measurement system may include a main housing 44 that may be attached to the coupler 28 of the trailer 20 at flange plate 42 by bolts 38. A jack housing or jacking tube 56 may be slidably disposed within the main housing 44. A shaft 46 may be positioned in the center of the main housing 44 and may be threaded at its lower end 48. The shaft threaded portion 52 may engage with a mating thread 54 on jacking tube 56. A pin 45 may be used to hold the shaft assembly in place. A crank handle 34 may be provided at a top end 50 of the shaft 46.

The jacking tube 56 may be constrained from rotating with respect to the main housing 44 by a tongue and groove feature 58 (see e.g., FIG. 4B) on the two parts 44, 56, but may allow free linear movement of the jacking tube 56 up and down relative to the main housing 44. For example, turning the crank handle 34 may cause the shaft 46 to rotate thereby causing movement of the jack housing 56 relative to the main housing 44. In this embodiment, turning of the crank handle 34 causing up or down movement of the jack housing 56 relative to the main housing 44. The direction of travel may be determined by the direction in which the crank handle 34 is rotated.

A thrust bearing 60 may be located at the interface between the threaded portion 52 and non-threaded portion 53 of the jack screw shaft 46. The thrust bearing 60 may bear against a shoulder 62 on the shaft 46. In a conventional tongue jack (not shown), this bearing would bear against the under side of the top of the main housing and give free rotation of the shaft relative to the housing. As shown in this embodiment of the trailer tongue weight measurement system, a spring 64 may be introduced between the bearing 60 and the inside top surface 66 of the main housing 44.

In addition to the spring 64, a calibrated scale 68 may be provided to indicate a load (i.e., weight) on the tongue jack 32. For example, a scale may be engraved or attached on the outside of the upper part of the shaft 46, as shown in FIG. 3. Alternatively, a series of color bands corresponding to a weight range may be used. For example, a red, yellow, and green color band may be provided to delineate proper weighing of the trailer. The scale 68 may include a zero point and a series on marks corresponding to a load or weight measurement. As shown in FIG. 3, the tongue jack 32 is unloaded and the zero point of the scale 68 is at the top of the housing 44.

In operation, the tongue 26 of the trailer 20 may be supported by the tongue jack 32 and the trailer 20 may or may not be attached to the hitch 12 of the tow vehicle 10. The spring 64 of the tongue jack 32 will deflect (e.g., compress) in direct proportion to the weight on the tongue jack 32. This deflection of spring 64 will cause the shaft 46 to move upward relative to the main housing 44 exposing the scale 68 on shaft 46. The weight on the trailer tongue 26 can then be read off the scale 68.

Figure 4A:
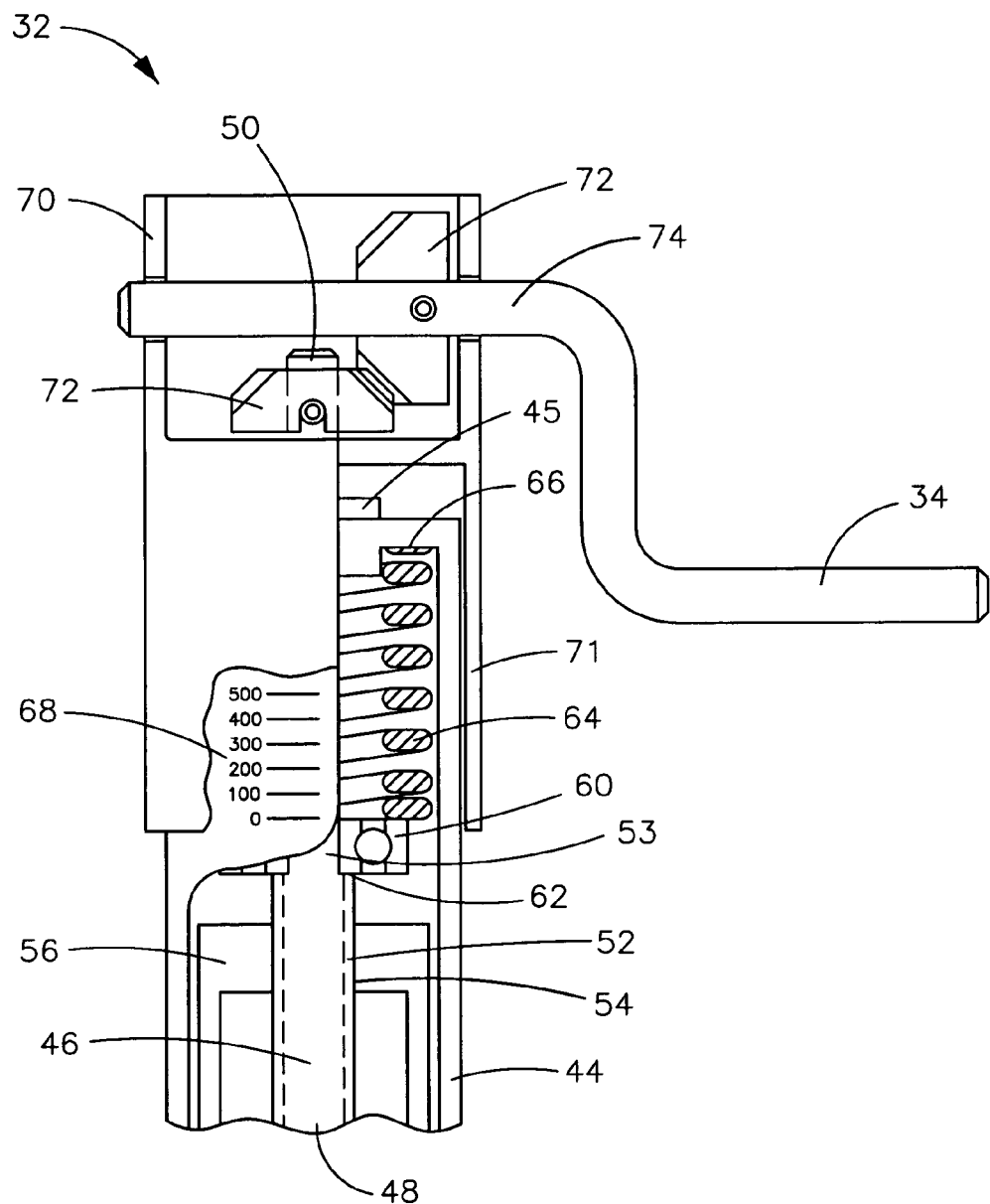
FIG. 4A is a side, partial sectional view of another exemplary tongue weight measurement system incorporated in to an exemplary trailer jack.

FIG. 4A shows another exemplary embodiment of the trailer tongue weight measurement system. As shown in FIG. 4A, the trailer tongue weight measurement system may include a modification to a standard trailer tongue jack. This embodiment of the weight measurement system may be designed into a new tongue jack or retrofitted into an existing tongue jack.

The second embodiment of trailer tongue weight measurement system is a result of a design feature incorporated on many tongue jacks now in production. That feature is at the top of the operating shaft 46 there is a gear housing 70 having a pair of bevel gears 72 so that instead of a vertical output shaft there is a horizontal output shaft 74. This is done for ease of operation and to facilitate a change in gear ratio between the crank handle 34 and the operating shaft 46. As such, the scale 68 on shaft 46 as used in the first embodiment would be covered by the gear housing 70 and not visible.

FIG. 4A illustrates the second embodiment. As in the first embodiment, the trailer weight measurement system may include a main housing 44 and a jack housing 56. The main housing 44 may be attached to the coupler 26 of the trailer 20 at flange plate 42 using bolts 38. A shaft 46 may be positioned in the center of the main housing 44. The shaft 46 may include a threaded portion 52 at its lower end 48 and a non-threaded portion 53 at its upper end 50.

Figure 4B:
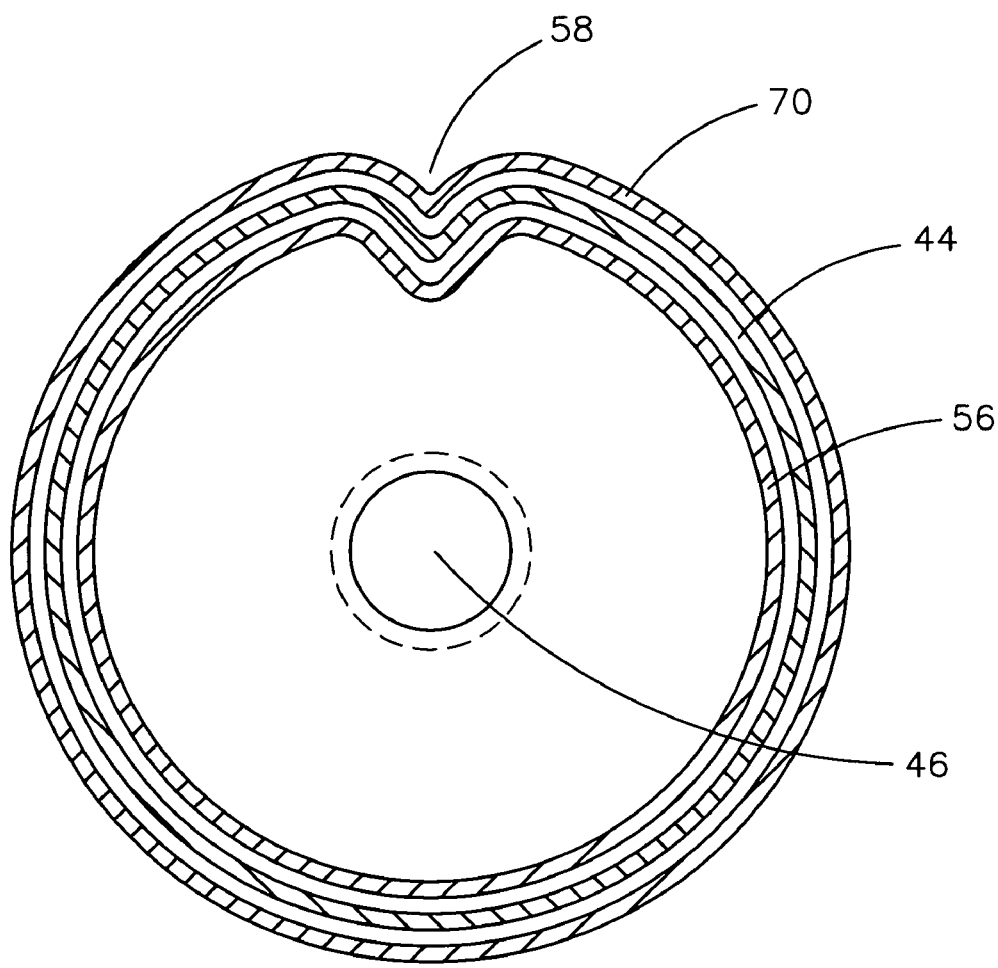
FIG. 4B is a detailed top, cross sectional view of the tongue weight measurement system of FIG. 4A.

Shaft 46 may be secured in place relative to the main housing 44 by a pin 45 to prevent spring 64, shaft 46, and the jacking tube 56 from falling out the bottom of the main housing 44. The threaded portion 52 of shaft 46 may engage a mating thread 54 on the jacking tube 56. As shown in FIG. 4B, the jacking tube 56 may be constrained in rotation with the main housing by a tongue and groove feature 58 on the two parts 44, 56, but is allowed free linear movement up and down relative to the main housing 44.

A thrust bearing 60 may be provided at the interface between the threaded portion of 52 and the non-threaded portion 53 of shaft 46. The thrust bearing 60 may bear against a shoulder 62 on the shaft 46. Again, in a conventional tongue jack this thrust bearing would bear against the under side of the top of the main housing and give free rotation of the shaft relative to the housing. As in the first embodiment described above, in this embodiment of a tongue jack 32 having a weight measurement system a spring 64 may be introduced between the bearing 60 and the inside top surface 66 of the main housing 44.

A gear housing 70 may be provided on an extension to shaft 46 and above pin 45 and the top of the main housing 44. This gear housing 70 may also be restrained in rotation by a tongue and groove feature 58 just like the main housing 44 to jacking tube 56 (see e.g., FIG. 4B). This gear housing 70 may house a right angle gear set 72 and the operating handle 34. The lower portion 71 of the gear housing 70 may overlap the main housing 44 to engage its anti-rotation feature and to provide a read out location for the weight scale 68. Preferably, the overlap is designed and constructed to be more that the travel of the spring 64 or the anti-rotation feature may disengage.

A scale 68 may be provided to indicate a load (i.e., weight) on the tongue jack 32. For example, a calibrated scale may be engraved or attached on the outside of the upper part of the main housing 44, as shown in FIG. 4A. Alternatively, a series of color bands corresponding to a weight range may be used. The scale 68 may include a zero point and a series on marks corresponding to a load or weight measurement. As shown in FIG. 4A, the tongue jack 32 is unloaded and the zero point of the scale 68 is at the lower edge of the lower portion 71 of gear housing 70. As such, with zero load the scale 68 is mostly hidden by the skirt or lower portion 71 of the gear housing 70.

In operation, the tongue 26 of the trailer 20 may be supported by the tongue jack 32 and the trailer 20 may or may not be attached to the hitch 12 of the tow vehicle 10. As weight is applied, the spring 64 of the tongue jack 32 will deflect (e.g., compress) in direct proportion to the weight on the jack tongue 32. This deflection of spring 68 will cause the shaft 46 and gear housing 70 to move upward relative to the main housing 44 exposing the scale 68 on housing 44. The weight on the tongue 26 of the trailer 20 can then be read off the scale 68.

Figure 5A:
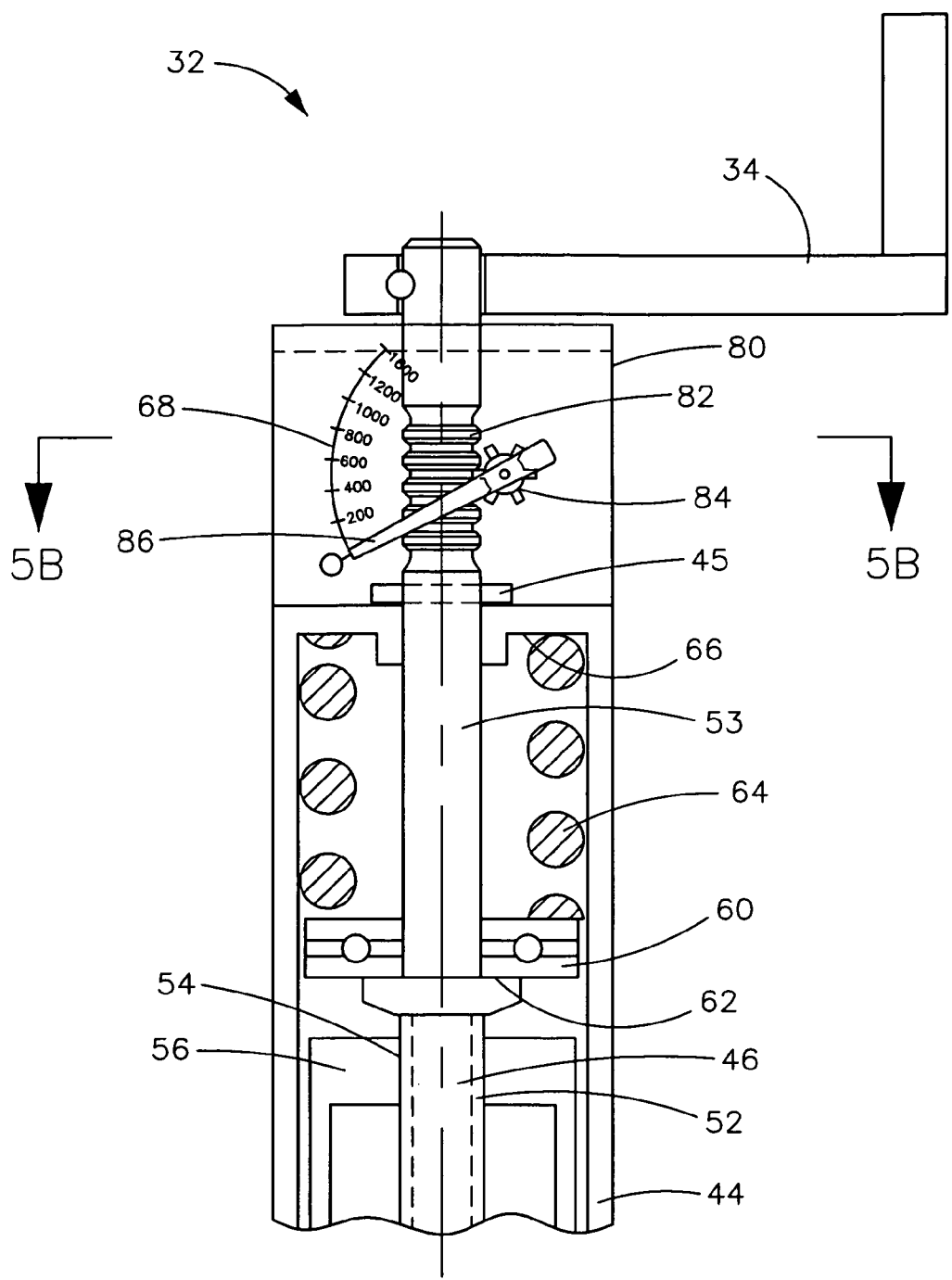
FIG. 5A is a side sectional view of another exemplary tongue weight measurement system incorporated in to an exemplary trailer jack.
Figure 5B:
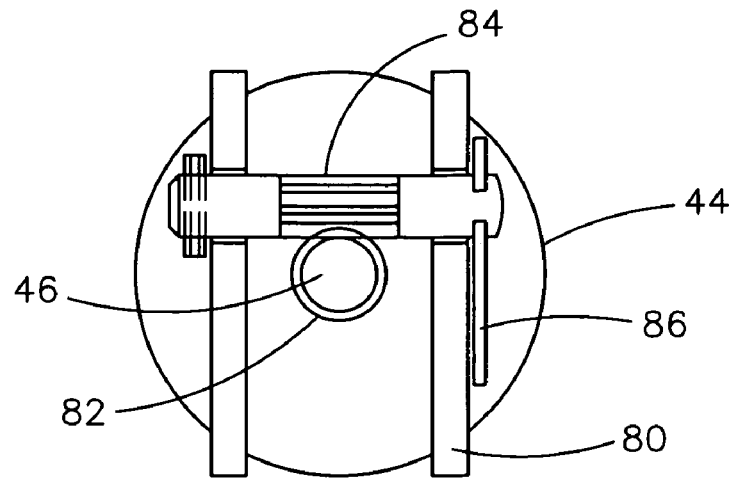
FIG. 5B is a sectional view taken along section line A-A of FIG. 5A.
Figure 5C:
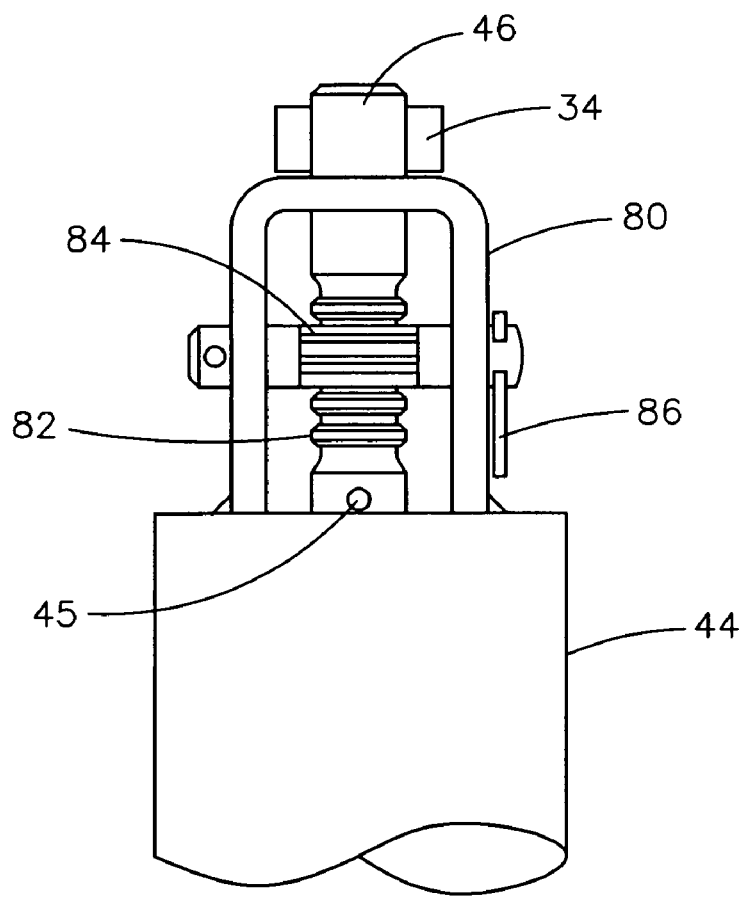
FIG. 5C is an end view of the exemplary tongue weight measurement system of FIG. 5A.

FIGS. 5A-5C show another exemplary embodiment of the trailer tongue weight measurement system. The embodiment of the trailer tongue weight measurement system shown in FIGS. 5A-5C results from the need to adapt trailer tongue weight measurement system to the needs of heavier classes of trailers. Since the outside diameter of the standard tongue jacks and the holes to receive them in standard couplers is a fixed size, there is a limit on the size of spring and its available deflection that can be fit within this envelope. What results in the case of stiffer springs required by heavier loads is that when the spring is strong enough for the given load the deflection of the spring may be so small that the scale would be very difficult to read accurately. Therefore, the embodiment shown in FIGS. 5A-5C provides a gage read out of unique design to amplify the movement of the spring to make it easier to read.

The tongue jack 32 illustrated in FIGS. 5A-5C is similar to the tongue jack shown in FIG. 3. As before, the main housing 44 of the tongue jack 32 may be attached to the coupler of the trailer at flange 42 using bolts 38. A shaft 46 may be disposed in the center of the housing 44. The shaft 46 may include a threaded portion 52 at its lower end 48 and a non-threaded portion 53 at its upper end 50. The top end of the shaft 46 may be located at the top of the main housing 44 by a pin 45 to prevent spring 64, shaft 46, and the jacking tube 56 from falling out the bottom of the main housing 44. The threaded portion 52 of the shaft 46 may engage a mating thread 54 on the jacking tube 56.

The jacking tube 56 may be constrained in rotation with the main housing 44 by a tongue and groove feature 58 between the two parts 44, 56, but is allowed free movement up and down relative to the main housing 44. A thrust bearing my be disposed at the interface between the threaded portion of 52 and the non-threaded or cylindrical portion 53 of shaft 46. The thrust bearing 60 may bear against a shoulder 62 on the shaft 46. The thrust bearing 60 allows free rotation of the shaft 46 relative to the housing 44. A spring 64 may be disposed between the bearing 60 and the inside top 66 of the main housing 44.

A gage housing 80 may be provided on the top of the main housing 44. For example, an inverted U shaped gage housing 80 may be formed integral with the main housing 44. Alternatively, the gage housing 80 may be formed separate from and connected to the main housing 44. As shown, the shaft 46 may extend through the gage housing 80 and the operating handle 34 may be attached to shaft 46. The portion of the shaft 46 that is within the gage housing 60 may be machined with a circular gear rack 82. This gage rack 82 may engage with a pinion gear 84. An indicator needle 86 may be connected to the pinion gear 84 via a shaft which may extend through an opening in the gage housing 80. A scale may be provided on the outside of the gear housing 80 for the read out of the weight on the tongue of the trailer.

The amplifier system of FIGS. 5A-5C may also be used with other types of tongue jacks, including the tongue jack shown in FIG. 4A.

Figure 6A:
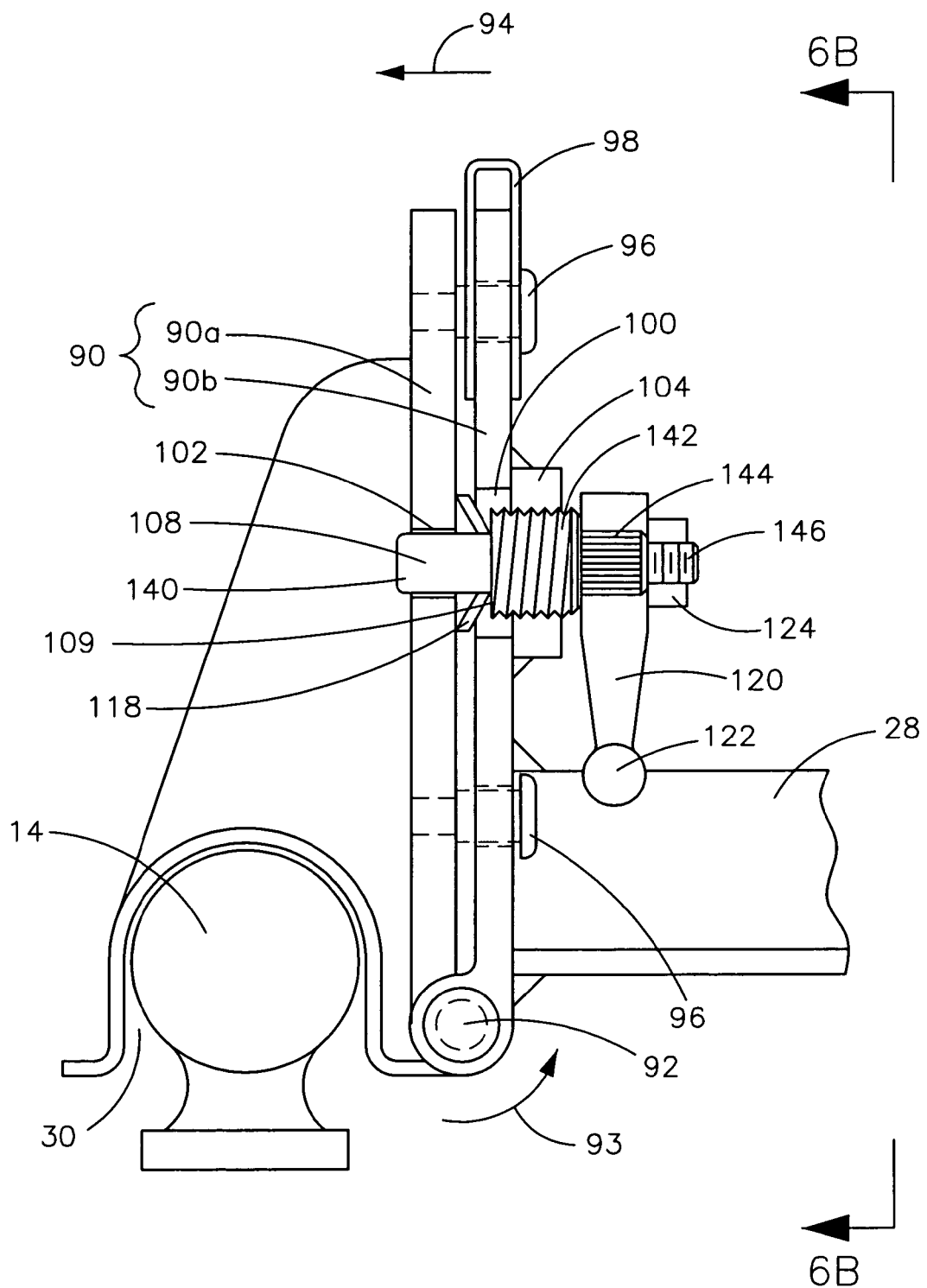
FIG. 6A is a side sectional view of another exemplary tongue weight measurement system incorporated in to an exemplary trailer tongue or coupler.
Figure 6B:
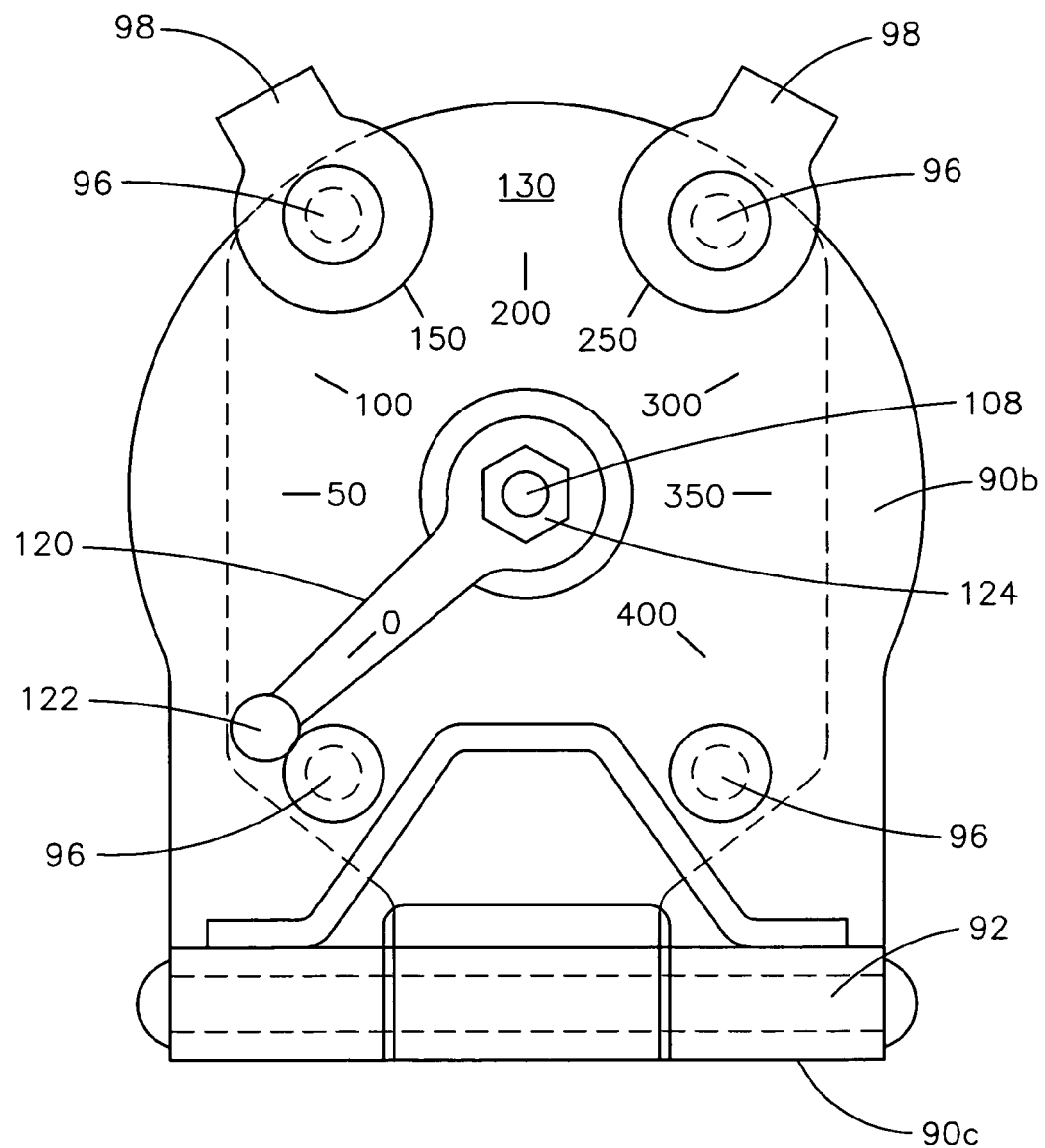
FIG. 6B is an end view of the exemplary tongue weight measurement system of FIG. 6A.

FIGS. 6A and 6B show another embodiment of the trailer tongue weight measurement system. The trailer tongue weight measurement system embodiment illustrated in FIGS. 6A and 6B is located at the trailer tongue coupler 28. The trailer tongue weight measurement system may be formed integral with the trailer tongue 26 or may be formed as a separate unit and attached to the trailer tongue 26.

As shown, the weight measuring system may be integral to the coupler 28 and ball receptacle 30 on the tongue 26 of the trailer 20. When a load is applied to the trailer it bears down on the hitch and the force on the ball receptacle is pushed up. One advantage of this embodiment is that the trailer tongue weight measuring system may be built directly into the trailer. Another advantage of an integral trailer tongue weight measuring system is that it may be a permanent part of the trailer. Yet another advantage is that the trailer tongue weight may be measured with the trailer attached to the tow vehicle. In order to retrofit this unit onto existing trailers, the unit would have to be formed as a separate unit and the trailer tongue may have to be modified to receive the unit. As shown in FIG. 6A, the trailer tongue weight measuring system may be used with a standard type hitch.

Also as shown in FIG. 6A, this embodiment of the tongue weight measuring system may be based on a normal type hinge plate assembly 90 having a front plate 90a and a rear plate 90b that may be pivotally connected using a hinge pin 92. Plates 90a and 90b are hinged together such that when there is load on the weight measurement system the plates 90a, 90b are pressed together. As shown, the front of the trailer tongue 26 or coupler 28 may be connected (e.g., welded) to the rear plate 90b of the hinge plate assembly 90. The front plate 90a of the hinge plate assembly 90 may be attached to the rear plate 90b by hinge pin 92 and a series of four shoulder bolts 96. The front plate 90a may also be connected (e.g., welded) to the ball receptacle 30 and its ball retention hardware (not shown).

In operation, the weight of the trailer 20 on the ball 14 causes the hinge plate 90b to close against hinge plate 90a. To limit the opening motion of the hinge plate assembly 90, four shoulder bolts 96 may pass through hinge plate 90b and may be screwed into hinge plate 90a. In an alternate embodiment, the orientation of the shoulder bolts may be reversed.

Figure 6C:
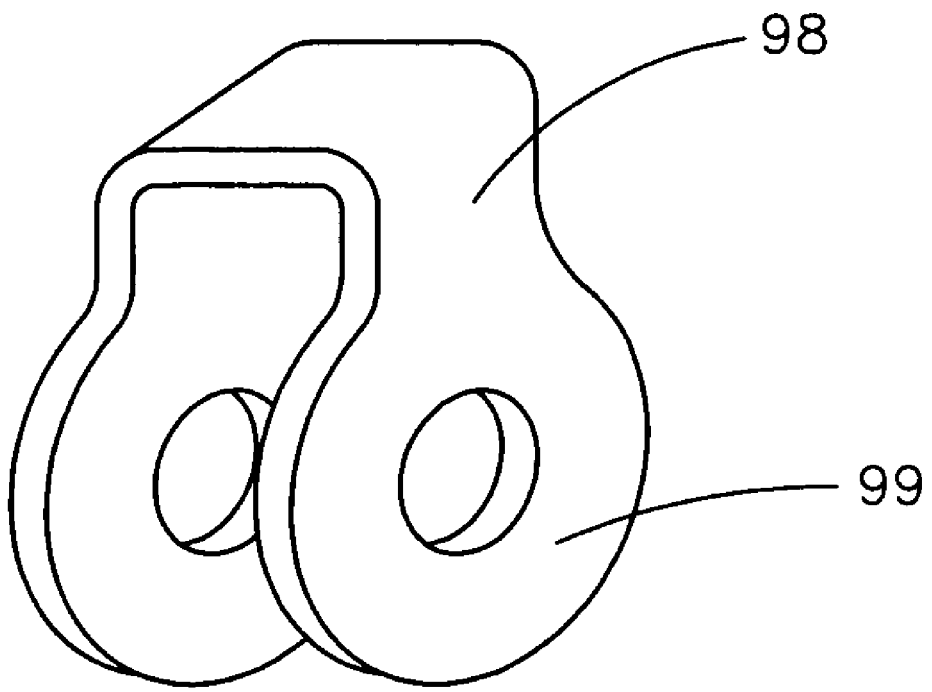
FIG. 6C is a perspective view of an exemplary stirrup type indicator of FIGS. 6A and 6B.

As shown in FIGS. 6A-6C, one or more clearance indicators 98 may be provided and captured by the upper shoulder bolts 96. As shown, the clearance indicators may comprise stirrups 98 that may surround an upper edge of hinge plate 90b. These stirrups 98 may act as indicators of when the tongue weight has been properly measured (i.e., not too high or too low). For example, the stirrups 98 may include a tolerance such that the total thickness of the two washers 99 plus the thickness of hinge plate 90b is between about 0.010 inch and about 0.020 inch less than the height of the shoulder of the shoulder bolts 9. Alternative devices may be placed between plates 90a and 90b to be used as indicators. When an indicator device is free to move, a weight of the trailer may be read.

As shown in FIG. 6A, two openings 100, 102 may be provided in the center of the two hinge plates 90a, 90b. As shown, the openings may be concentric to each other and may include a smaller opening 102 in the front plate 90a and a larger opening 100 in the rear plate 90b. A nut 104 may be connected (e.g., welded) to the rear of the rear plate 90b. The nut 104 may be concentric to the opening 100 and the nut 104 may include a right hand threaded portion 106.

Shaft 108 may be threaded into the nut 104 and may protrude through the opening 102 in front hinge plate 90a. As shown, shaft 108 has several features including a forward cylindrical portion 140, a central threaded section 142, a tapered spline 144, and a small diameter threaded section 146.

A spring 118 may be provided between the hinge plates 90a and 90b to urge the hinge plates 90a, 90b apart. As shown, spring 118 may be place over shaft 108 between the two hinge plates 90a and 90b. In one embodiment, the spring 118 may include one or more spring washers, such as Belleville spring washers, that surround the cylindrical section 140 of the shaft 108 and are captured between a shoulder 109 on the large threaded section 142 and the front hinge plate 90a. With the two hinge plates 90a and 90b held tight together, shaft 108 may be turned counterclockwise until it is snug against spring 118 and then the handle 120 may be placed over the spline section 114 on shaft 108 such that the knob 122 on the handle 120 is located over the zero location on the weight scale 130 on the rear face 132 of hinge plate 90b. The handle 120 may be secured to the shaft 108 with nut 124.

In operational use, the trailer mount unit having the weight measuring system may be connected to the towing vehicle 10 by placing the trailer ball receptacle 30 over the hitch ball 14. The trailer load pushing down on ball 14 and the weight of the trailer 20 will firmly clamp the indicator stirrups 98 between hinge plates 90a and 90b.

To determine the tongue weight, the operator may grasp one of the stirrups 98 and rotate the handle 120, for example clockwise, from the zero position until the stirrup indicator 98 is free to move. This freedom of movement being caused by the rotation of shaft 108 into nut 104 by the handle 120 and the resultant axial movement of shaft shoulder 109 against spring 118. The load in spring 118 will increase until at some point it will balance the opposing load on the ball 14 and cause the two hinge plates 90a and 90b to move apart, thereby freeing the stirrup indicator(s) 98 to move/rotate.

When the stirrup indicator 98 becomes free, the weight under the knob 122 on handle 120 may be read as the weight on the tongue 26 of the trailer 20. If the handle 120 is turned too far, then the stirrup 98 will be restrained by being clamped between the head of the shoulder bolt 96 and hinge plate 90b. This double action of the stirrup 98 helps assure a proper weight is read on the scale 130.

Figure 7A:
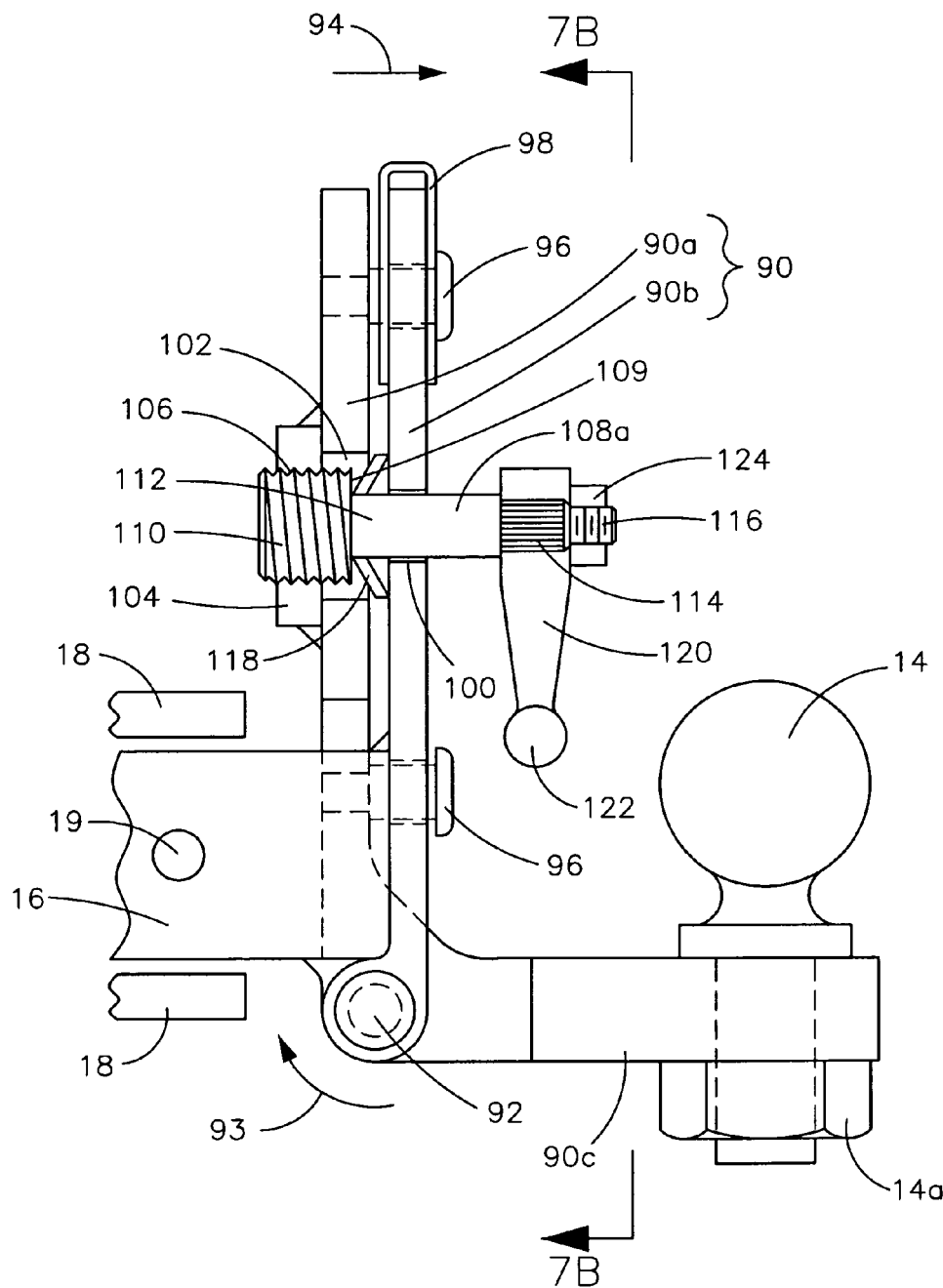
FIG. 7A is a side sectional view of another exemplary tongue weight measurement system incorporated in to an exemplary hitch.
Figure 7B:
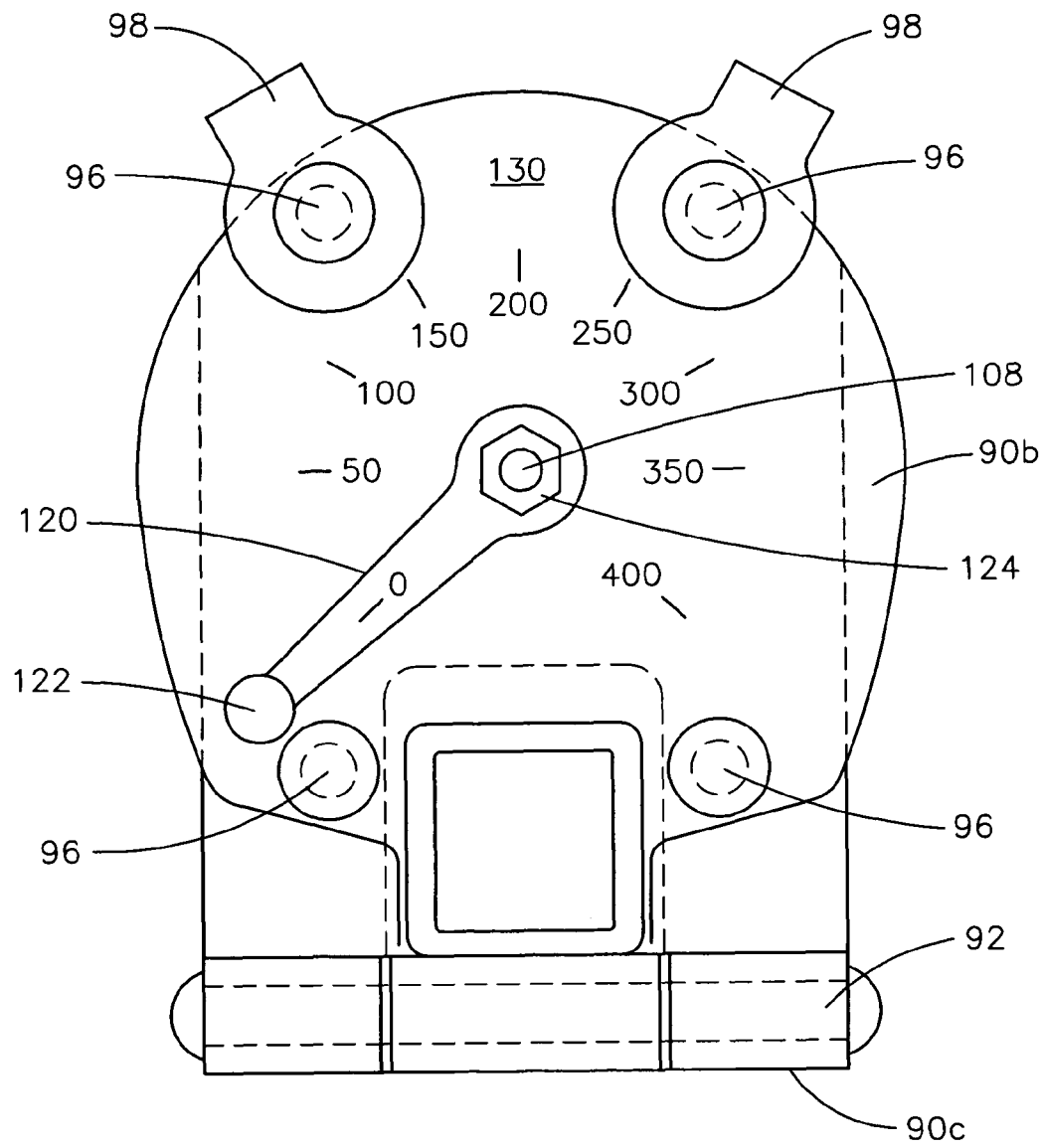
FIG. 7B is an end view of the exemplary tongue weight measurement system of FIG. 7A.

FIGS. 7A and 7B show another embodiment of the trailer tongue weight measurement system. In this embodiment, the trailer tongue weight measurement system is on the hitch 12. As illustrated, this embodiment is similar to the embodiment of FIGS. 6A and 6B in that the principles of operation are similar even though some of the parts are in effect reversed because the forces are in the opposite direction between the two embodiments. In the embodiment of FIGS. 6A and 6B the force on the unit was pushing up on the ball receptacle 30, and in the embodiment of FIGS. 7A and 7B the forces are pushing down on the ball mount 14.

The embodiment illustrated in FIGS. 7A and 7B is based on a scissor type hinge plate assembly 90, including front plate 90a and rear plate 90b. As shown, the trailer tongue weight measurement system hinge plate assembly 90 may be connected (e.g., welded) to the hitch 12. In the embodiment illustrated in FIGS. 7A and 7B, the rear hinge plate 90b may be attached (e.g., welded) to the tubing 16 of the ball mount 14. The bottom of this hinge plate 90 may include a hinge pin 92 that allows the hinge plates 90a, 90b to pivot relative to one another. As shown, the forward half 90a of the hinge plate assembly 90 may be L-shaped and may surround the tubing 16. In addition, the forward plate 90a of the hinge plate assembly 90 (the lower portion 90c of the L-shaped plate) may also protrude rearward to support the hitch ball 14 and its fixing nut 14a.

In operation, the weight of the trailer 20 on the ball 14 causes the hinge plate 90a to close against hinge plate 90b (in the direction of arrow 94). To limit the opening motion of the hinge, four shoulder bolts 96 may pass through hinge plate 90b and may be screwed into hinge plate 90a. In an alternate embodiment, the orientation of the shoulder bolts may be reversed.

Stirrup indicators 98 may be provided and captured by the upper two shoulder bolts 96. As shown, the stirrups 98 may surround plate 90b. These stirrups 98 may act as indicators of when the tongue weight has been properly measured (i.e., when the operating handle 120 has loaded the spring 118 to counter balance the weight on the tongue of the trailer 20). For example, the stirrups 98 may include a tolerance such that the total thickness of the two washer portions 99 plus the thickness of hinge plate 90b is between about 0.010 inch to about 0.020 inch less than the height of the shoulder of the shoulder bolts 96.

As shown in FIG. 7A, two openings 100, 102 may be provided in the center of the two hinge plates 90a, 90b. As shown, the openings may be concentric to each other and may include a smaller opening 100 in the rear plate 90b and a larger opening 102 in the front plate 90a. A nut 104 may be connected (e.g., welded) to the front of the front plate 90a. The nut 104 may be concentric to the opening 102 and the nut 104 may include a left hand threaded portion 106. Shaft 108a may be threaded into the nut 104 and may protrude through the opening 100 in rear hinge plate 90b. As shown, shaft 108a has several features including a forward threaded portion 110, a cylindrical portion 112, a tapered spline portion 114, and finally a small diameter threaded section 116.

A spring 118 may be provided between the hinge plates 90a and 90b to urge the hinge plates 90a, 90b apart. As shown, spring 118 may be place over shaft 108a between the two hinge plates 90a and 90b. In one embodiment, the spring 118 may include one or more spring washers, such as Belleville spring washers, that surround the cylindrical section 112 of the shaft 108a and are captured between a shoulder 109 on the large/raised threaded section 110 and the rear hinge plate 90b. With the two hinge plates 90a and 90b held tight together, shaft 108a may be turned counterclockwise until it is snug against spring 118 and then the handle 120 may be placed over the spline section 114 on shaft 108a such that the knob 122 on the handle 120 is located over the zero location on the weight scale 130 on the rear face 132 of hinge plate 90b. The handle 120 may be secured to the shaft 108a with a nut 124.

In operational use, the hitch mount unit having the weight measurement system may be connected to the tow vehicle 10 by sliding the square tubing 16 into the receiver 18 on the hitch 12 and securing it in place with pin 19, as shown in FIG. 7A. With the hitch 12 secured to the towing vehicle 10, the trailer tongue 26 may be connected to the hitch 12 by placing the trailer ball receptacle 30 over the hitch ball mount 14. The load pushing down on ball 14 also pushes down on the lower portion 90c of the L-shape hinge plate 90a. This causes the L-shape hinge plate 90a to pivot or rotate about hinge pin 92 (in the direction of arrow 93) and causes the hinge half 90a to close against hinge half 90b (in the direction of arrow 94). This movement captures the spring 118 between hinge plates 90a and 90b. The weight of the trailer 20 will then firmly clamps the indicator stirrups 98 between hinge plates 90a and 90b.

To determine the tongue weight, the operator may grasp one of the stirrup indicators 98 and rotate the handle 120, for example clockwise, from the zero position until the stirrup indicator 98 is free to move. This freedom of movement being caused by the rotation of shaft 108a into nut 104 by the handle 120 and the resultant axial movement of shaft shoulder 109 against spring 118. The load in spring 118 will increase until at some point it will balance the opposing load on the ball 14 and cause the two hinge plates 90a and 90b to move apart, thereby freeing the stirrup indicator(s) 98 to move/rotate.

When a stirrup indicator 98 becomes free, the weight under the knob 122 on the handle 120 can be read as the weight on the tongue 26 of the trailer 20. If the handle 120 is turned too far, then the stirrup indicator(s) 98 will be restrained by being clamped between the head of the shoulder bolt 96 and plate 90b indicating to the user that he or she has not adjusted it properly. This double action of the stirrup 98 helps assure a proper weight is read on scale 130.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit of the invention.

What is claimed:

1. A trailer weight measurement system comprising:
  a split housing, wherein one part of the split housing may move relative to another part of the split housing, wherein the split housing further comprises a three-dimensional hollow tubular housing comprising a main housing and a jack housing, the jack housing slidably disposed within the main housing and extending through an open bottom end of the main housing;
  a shaft rotatably disposed within the split housing, the shaft comprising:
    a non-threaded portion;
    a distal end of the non-threaded portion of the shaft extending through a shaft opening in one part of the split housing;
    a threaded portion, the threaded portion being threaded into a threaded hole in the other part of the split housing;
    a shoulder separating the non-threaded portion and the threaded portion of the shaft;
  a spring located within the split housing and concentrically around the shaft between the shaft shoulder and an inside surface of one part of the split housing;

a handle located external to the split housing and connected to the distal end of the non-threaded portion of the shaft; and a scale having a zero point and a series of indicators corresponding to a weight being measured by the weight measurement system.

2. The trailer weight measurement system of claim 1, wherein:
the main housing further comprising:
a top end having the shaft opening;
the open bottom end;
a side wall extending between the top end and the open bottom end;
the jack housing further comprising:
a top end;
the threaded hole in a center of the top end;
a bottom end;
a foot plate at the bottom end of the jack housing for engaging a support surface;
the shaft further comprising:
the distal end of the non-threaded portion of the shaft extending through the shaft opening in the top end of the main housing;
the threaded portion being threaded into the threaded hole in the top end of the jack housing;
a thrust bearing disposed concentrically about the non-threaded portion of the shaft, a first side of the thrust bearing contacting the shaft shoulder;
the spring disposed concentrically about the non-threaded portion of the shaft, a first end of the spring contacting a second side of the thrust bearing, and a second end of the spring contacting an inside surface of the top end of the main housing, the spring acting to urge the main housing and the jack housing apart; and
the scale located on the non-threaded portion of the shaft proximate the shaft opening, the scale having a zero point and a series of indicators corresponding to a weight being measured by the weight measurement system.

3. The trailer weight measurement system of claim 2, wherein the weight measurement system may be calibrated so that the zero point of the scale is at the shaft opening with no load on the system, and wherein the shaft moves upward out through the shaft opening as a load is applied to the system and the spring compresses thereby revealing the series of indicators on the scale on the shaft.

4. The trailer weight measurement system of claim 1, wherein:
the main housing further comprising:
a top end having the shaft opening;
the open bottom end;
a side wall extending between the top end and the open bottom end;
the jack housing further comprising:
a top end;
the threaded hole in a center of the top end;
a bottom end;
a foot plate at the bottom end of the jack housing for engaging a support surface;
a gear housing slidably disposed over the top end of the main housing and the distal end of the shaft, the gear housing comprising:
a right angle gear set connected to the non-threaded portion of the shaft extending through the shaft opening, the gear set for transitioning the shaft output 90 degrees;
an upper portion of the gear housing extending above the main housing and enclosing the gear set;
a lower portion of the gear housing extending over and about an upper portion of the main housing to a lower edge;
the shaft further comprising:
the distal end of the non-threaded portion of the shaft extending through the shaft opening in the top end of the main housing;
the threaded portion being threaded into the threaded hole in the top end of the jack housing;
a thrust bearing disposed concentrically about the non-threaded portion of the shaft, a first side of the thrust bearing contacting the shaft shoulder;
the spring disposed concentrically about the non-threaded portion of the shaft, a first end of the spring contacting a second side of the thrust bearing, and a second end of the spring contacting an inside surface of the top end of the main housing, the spring acting to urge the main housing and the jack housing apart; and
the scale located on upper portion of the main housing, the scale having a zero point and a series of indicators corresponding to a weight being measured by the weight measurement system.

5. The trailer weight measurement system of claim 4, wherein the weight measurement system may be calibrated so that the zero point of the scale is at the lower edge of the gear housing with no load on the system, and wherein the gear housing moves upward with the shaft as a load is applied to the system and the spring compresses thereby revealing the series of indicators on the scale on the main housing.

6. The trailer weight measurement system of claim 1, further comprising a flange plate extending from the main housing and having one or more holes for connecting the trailer weight measurement system to a coupler of a trailer.

7. The trailer weight measurement system of claim 1, further comprising a pin for securing the shaft in place relative to the main housing, the pin holding the shaft, spring, thrust bearing, and jack housing from falling out the bottom of the main housing.

8. The trailer weight measurement system of claim 1, further comprising a crank shaft connected to the non-threaded portion of the shaft extending through the opening in the top end of the main housing, wherein rotation of the crank shaft causes rotation of the shaft and sliding movement of the jack housing relative to the main housing.

9. The trailer weight measurement system of claim 1, further comprising a tongue and groove formed between the main housing and the jack housing, the tongue and groove constraining rotational movement between the main housing and the jack housing.

10. The trailer weight measurement system of claim 1, further comprising a gage read out for amplifying the spring deflection to make it easier to read.

11. The trailer weight measurement system of claim 10, wherein the gage read out further comprises:
a gage housing disposed over the top end of the main housing, wherein the shaft extends through the gage housing;
a circular gear rack formed on the portion of the shaft extending through the gage housing;
a pinion gear engaged with the circular gear rack;
a shaft extending from the pinion gear through an opening in the gage housing to an exterior of the gage housing; and an indicator needle connected to the shaft and extending over the scale, the scale being formed on an exterior surface of the gage housing.

12. The trailer weight measurement system of claim 1, wherein the weight measurement system is retrofit into an existing trailer tongue jack by replacing at least the shaft and adding the spring.

13. The trailer weight measurement system of claim 1, wherein the weight measurement system is formed integral with a new trailer tongue jack.

14. The trailer weight measurement system of claim 1, wherein the spring further comprises a coil spring.

15. The trailer weight measurement system of claim 1, wherein the split housing further comprises a hinge plate assembly having a first plate and a second plate, the second plate pivotally connected at one end by a pivot pin to the first plate.

16. The trailer weight measurement system of claim 15, wherein:
the first plate connected to a ball receptacle, the first plate further comprising:
the shaft opening located proximate a center of the first plate;
one or more threaded holes;
a hinge pin receptacle proximate a bottom edge of the first plate;
the second plate connected to the trailer coupler, the second plate further comprising:
a shaft opening located proximate a center of the second plate, wherein the shaft opening in the second plate corresponds in location to the shaft opening in the first plate;
the threaded hole concentric with the shaft opening of the second plate;
one or more through holes, wherein the through holes on the second plate correspond in number and location to the one or more threaded holes on the first plate;
a hinge pin receptacle proximate a bottom edge of the second plate;
the hinge pin extending though the hinge pin receptacles of the first and second plates, the hinge pin allowing the first and second plates to move relative to one another;
one or more shoulder bolts, each shoulder bolt comprising a head, a shoulder, and a threaded shaft, wherein each shoulder bolt is inserted through one of the through hole in the second plate, and threaded into one of the threaded holes in the first plate;
one or more clearance indicators, each clearance indicator comprising an opening surrounded by a body portion, the clearance indicator being disposed between the first plate and the second plate and having a shoulder bolt inserted through the opening in the clearance indicator;
the distal end of the non-threaded portion of the shaft extending through the shaft opening in the first plate;
the threaded portion being threaded into the threaded hole in the second plate;
the spring disposed concentrically about the non-threaded portion of the shaft, a first end of the spring contacting a rear surface of the first plate and a second end of the spring contacting the shaft shoulder, the spring acting to urge the plates apart; and
the scale located on an exterior surface of one of the first and second plates, the scale having a zero point and a series of indicators corresponding to a weight being measured by the weight measurement system.

17. The trailer weight measurement system of claim 16, wherein the spring further comprises one or more spring washers.

18. The trailer weight measurement system of claim 16, further comprising:
a spindle portion and a second threaded portion on the shaft;
a handle comprising an opening that slides over the shaft and engages the spindle portion; and
a nut threaded onto the second threaded portion of the shaft.

19. The trailer weight measurement system of claim 18, wherein:
the handle is placed on the shaft and over the zero point of the scale when the trailer weight measurement system is unloaded;
wherein in a loaded condition, the handle may be rotated until the one or more clearance indicators are free to move; and
the weight measured by the trailer weight measurement system may be read from the scale based on the position of the handle.

20. The trailer weight measurement system of claim 19, wherein the clearance indicators further comprise double action stirrup clearance indicators, wherein if the handle is rotated too far, then the double action stirrup clearance indicators will be restrained by being clamped between a head of the shoulder bolt and the second plate to help assure a proper weight is read on the scale.

21. The trailer weight measurement system of claim 19, wherein:
the spindle portion extends from the threaded portion of the shaft, and the second threaded portion extends from the spindle portion; and
the scale being located on a rear surface of the second plate.

22. The trailer weight measurement system of claim 16, wherein the one or more clearance indicators further comprise stirrups, each stirrup comprising a U-shape body portion having two washer portions and an opening in each washer portion, the U-shape body portion surrounding a top edge of the second plate and the shoulder bolt passing through the opening in each washer portion.

23. The trailer weight measurement system of claim 16, wherein the trailer weight measurement system is formed integral with the trailer coupler.

24. The trailer weight measurement system of claim 16, wherein the trailer weight measurement system is formed separate from the trailer coupler and is connected to the trailer coupler.

25. The trailer weight measurement system of claim 16, wherein the threaded hole in the second plate further comprises a nut having a threaded through hole, the nut being positioned so that the nut through hole is concentric over the shaft hole in the second plate, the nut connected to a rear surface of the second plate.

26. The trailer weight measurement system of claim 16, wherein:
the first plate connected to a hitch, the first plate further comprising:
a shaft opening located proximate a center of the first plate;
the threaded hole concentric with the shaft opening of the first plate;
one or more threaded holes;
a hinge pin receptacle proximate a bottom edge of the first plate;

the second plate connected to a ball, the second plate further comprising:
    the shaft opening located proximate a center of the second plate, wherein the shaft opening in the second plate corresponds in location to the shaft opening in the first plate;
    one or more through holes, wherein the through holes on the second plate correspond in number and location to the one or more threaded holes on the first plate;
    a hinge pin receptacle proximate a bottom edge of the second plate;
the hinge pin extending though the hinge pin receptacles of the first and second plates, the hinge pin allowing the first and second plates to move relative to one another;
one or more shoulder bolts, each shoulder bolt comprising a head, a shoulder, and a threaded shaft, wherein each shoulder bolt is inserted through one of the through hole in the second plate, and threaded into one of the threaded holes in the first plate;
one or more clearance indicators, each clearance indicator comprising an opening surrounded by a body portion, the clearance indicator being disposed between the first plate and the second plate and having a shoulder bolt inserted through the opening in the clearance indicator;
the distal end of the non-threaded portion of the shaft extending through the shaft opening in the second plate;
the threaded portion being threaded into the threaded hole in the first plate;
the spring disposed concentrically about the non-threaded portion of the shaft, a first end of the spring contacting a front surface of the second plate and a second end of the spring contacting the shaft shoulder; and
the scale located on one of: a front surface of the first plate or a rear surface of the second plate, the scale having a zero point and a series of indicators corresponding to a weight being measured by the weight measurement system.

27. The trailer weight measurement system of claim 26, wherein the spring further comprises one or more spring washers.

28. The trailer weight measurement system of claim 26, further comprising:
    a spindle portion and a second threaded portion on the shaft;
    a handle comprising an opening that slides over the shaft and engages the spindle portion; and
    a nut threaded onto the second threaded portion of the shaft.

29. The trailer weight measurement system of claim 27, wherein:
    the handle is placed on the shaft and over the zero point of the scale when the trailer weight measurement system is unloaded;
    wherein in a loaded condition, the handle may be rotated until the one or more clearance indicators are free to move; and
    the weight measured by the trailer weight measurement system may be read from the scale based on the position of the handle.

30. The trailer weight measurement system of claim 29, wherein the clearance indicators further comprise double action stirrup clearance indicators, wherein if the handle is rotated too far, then the double action stirrup clearance indicators will be restrained by being clamped between a head of the shoulder bolt and the second plate to help assure a proper weight is read on the scale.

31. The trailer weight measurement system of claim 29, wherein:
    the spindle portion extends from the non-threaded portion of the shaft, and the second threaded portion extends from the spindle portion; and
    the scale being located on a rear surface of the second plate.

32. The trailer weight measurement system of claim 26, wherein the one or more clearance indicators further comprise stirrups, each stirrup comprising a U-shape body portion having two washer portions and an opening in each washer portion.

33. The trailer weight measurement system of claim 26, wherein the one or more clearance indicators further comprise stirrups, each stirrup comprising a U-shape body portion having two washer portions and an opening in each washer portion, the U-shape body portion surrounding a top edge of the second plate and the shoulder bolt passing through the opening in each washer portion.

34. The trailer weight measurement system of claim 26, wherein the trailer weight measurement system is formed integral with the hitch.

35. The trailer weight measurement system of claim 26, wherein the trailer weight measurement system is formed separate from the hitch and is connected to the hitch.

36. A trailer tongue weight measurement system comprising:
    a tongue jack having a mounting flange for mounting the tongue jack to a tongue of a trailer, the trailer jack for supporting the trailer tongue relative to a support surface;
    a main housing comprising:
        a top end having a shaft opening;
        an open bottom end; and
        a side wall extending between the top end and the open bottom end;
    a jack housing slidably disposed within the main housing and extending from the open bottom end, the jack housing comprising:
        a top end having a threaded hole;
        a foot plate at a bottom end of the jack housing for engaging the support surface;
        a side wall extending between the top end of the jack housing and the foot plate;
    a shaft rotatably disposed within the main housing, the shaft comprising:
        a non-threaded upper portion;
        a distal end of the non-threaded upper portion of the shaft extending through the shaft opening in the top end of the main housing;
        a threaded lower portion, the threaded lower portion being threaded into the threaded hole in the top end of the jack housing;
        a shoulder separating the non-threaded portion and the threaded portion;
    a thrust bearing disposed concentric about the non-threaded portion of the shaft, a first side of the thrust bearing contacting the shaft shoulder;
    a coil spring disposed concentrically about the non-threaded portion of the shaft, a first end of the spring contacting a second side of the thrust bearing, and a second end of the spring contacting an inside surface of the top end of the main housing; and
    a scale on the shaft, the scale having a zero point and a series of indicators corresponding to a weight being measured by the weight measurement system, wherein a load on the tongue jack causes a deflection of the spring and an upward movement of the shaft thereby exposing the scale.

37. The trailer tongue weight measurement system of claim 36, further comprising a crank shaft connected to the non-threaded portion of the shaft extending through the opening in the top end of the main housing, wherein rotation of the crank shaft causes rotation of the shaft and sliding movement of the jack housing relative to the main housing.

38. The trailer tongue weight measurement system of claim 36, wherein the trailer tongue weight measurement system is calibrated such that in an unloaded condition, the zero point on the scale is located at the shaft opening.

39. A trailer tongue weight measurement system comprising:
- a tongue jack having a mounting flange for mounting the tongue jack to a tongue of a trailer, the trailer jack for supporting the trailer tongue relative to a support surface;
- a main housing comprising:
  - a top end having a shaft opening;
  - an open bottom end; and
  - a side wall extending between the top end and the open bottom end;
- a jack housing slidably disposed within the main housing and extending from the open bottom end, the jack housing comprising:
  - a top end having a threaded hole;
  - a foot plate at a bottom end of the jack housing for engaging the support surface;
  - a side wall extending between the top end of the jack housing and the foot plate;
- a gear housing slidably disposed over the top end of the main housing and the distal end of the shaft, the gear housing comprising:
  - a gear set connected to the non-threaded portion of the shaft extending through the shaft opening;
  - an upper portion of the gear housing extending above the main housing and enclosing the gear set;
  - a lower portion of the gear housing extending over and about an upper portion of the main housing;
  - a lower edge of the lower portion;
- a shaft rotatably disposed within the main housing, the shaft comprising:
  - a non-threaded upper portion;
  - a distal end of the non-threaded upper portion of the shaft extending through the shaft opening in the top end of the main housing, the distal end of the shaft connected to the gear set;
  - a threaded lower portion, the threaded lower portion being threaded into the threaded hole in the top end of the jack housing;
  - a shoulder separating the non-threaded portion and the threaded portion;
- a thrust bearing disposed concentric about the non-threaded portion of the shaft, a first side of the thrust bearing contacting the shaft shoulder;
- a coil spring disposed concentrically about the non-threaded portion of the shaft, a first end of the spring contacting a second side of the thrust bearing, and a second end of the spring contacting an inside surface of the top end of the main housing; and
- a scale on the exterior surface of the upper portion of the main housing, the scale having a zero point and a series of indicators corresponding to a weight being measured by the weight measurement system, wherein a load on the tongue jack causes a deflection of the spring and an upward movement of the shaft and gear housing thereby exposing the scale.

40. The trailer tongue weight measurement system of claim 39, further comprising a crank shaft connected to the gear set, the crank shaft having a horizontal output, wherein rotation of the crank shaft causes rotation of the shaft and sliding movement of the jack housing and gear housing relative to the main housing.

41. The trailer tongue weight measurement system of claim 39, wherein the trailer tongue weight measurement system is calibrated such that in an unloaded condition, the zero point on the scale is located at the bottom edge of the gear housing.

42. A trailer tongue weight measurement system comprising:
- a trailer;
- a tongue extending from the trailer;
- a coupler at a distal end of the tongue;
- a weight measurement system on the tongue, the weight measurement system comprising:
  - a first plate connected to a ball receptacle;
  - a second plate connected to the tongue coupler;
  - a pivot pin pivotally connecting the first plate and the second plate proximate a bottom edge of the first and second plates;
  - the first plate further comprising:
    - a shaft opening located proximate a center of the first plate;
    - one or more threaded holes;
  - the second plate further comprising:
    - a shaft opening located proximate a center of the second plate, wherein the shaft opening in the second plate corresponds in location to the shaft opening in the first plate;
    - a threaded hole concentric with the shaft opening of the second plate;
    - one or more through holes, wherein the through holes on the second plate correspond in number and location to the one or more threaded holes on the first plate;
  - one or more shoulder bolts, each shoulder bolt comprising a head, a shoulder, and a threaded shaft, wherein each shoulder bolt is inserted through one of the through holes in the second plate, and threaded into one of the threaded holes in the first plate;
  - one or more clearance indicators, each clearance indicator comprising an opening surrounded by a body portion, the clearance indicator being disposed between the first plate and the second plate and having a shoulder bolt inserted through the opening in the clearance indicator;
  - a shaft rotatably disposed between the first plate and the second plate, the shaft comprising:
    - a non-threaded portion that extends through the shaft opening in the first plate;
    - a threaded portion that is threaded into the threaded hole in the second plate;
    - a shoulder between the non-threaded portion and the threaded portion of the shaft;
  - a spring disposed concentrically about the non-threaded portion of the shaft, the first end of the spring contacting a rear surface of the first plate and the second end of the spring contacting the shaft shoulder, the spring acting to urge the plates apart; and the scale located on an exterior surface of the second plate, the scale having a zero point and a series of indicators corresponding to a weight being measured by the weight measurement system.

43. The trailer tongue weight measurement system of claim 42, further comprising a handle connected to the shaft, the handle being located over the scale, wherein rotation of the handle causes rotation of the shaft and either compression or release of the spring.

44. The trailer tongue weight measurement system of claim 43, wherein the trailer tongue weight measurement system is calibrated such that in a loaded condition, the zero point on the scale is located under the handle and the handle is rotated until the one or more clearance indicators are free to move, the position of the handle over the scale when the clearance indicators are free to move indicating the weight on the trailer tongue.

45. A trailer tongue weight measurement system comprising:
   a trailer hitch having tubing that extends into a receiver on a tow vehicle, and a ball for engaging a ball receptacle on a trailer to be towed;
   a weight measurement system on the hitch, the weight measurement system comprising:
      a first plate connected to the ball;
      a second plate connected to the hitch tubing;
      a pivot pin pivotally connecting the first plate and the second plate proximate a bottom edge of the first and second plates;
      the first plate further comprising:
         a shaft opening located proximate a center of the first plate;
         a threaded hole concentric with the shaft opening of the first plate;
         one or more threaded holes;
      the second plate further comprising:
         a shaft opening located proximate a center of the second plate, wherein the shaft opening in the second plate corresponds in location to the shaft opening in the first plate;
         one or more through holes, wherein the through holes on the second plate correspond in number and location to the one or more threaded holes on the first plate;
      one or more shoulder bolts, each shoulder bolt comprising a head, a shoulder, and a threaded shaft, wherein each shoulder bolt is inserted through one of the through hole in the second plate, and threaded into one of the threaded holes in the first plate;
      one or more clearance indicators, each clearance indicator comprising an opening surrounded by a body portion, the clearance indicator being disposed between the first plate and the second plate and having a shoulder bolt inserted through the opening in the clearance indicator;
      a shaft rotatably disposed between the first plate and the second plate, the shaft comprising:
         a non-threaded portion that extends through the shaft opening in the second plate;
         a threaded portion that is threaded into the threaded hole in the first plate;
         a shoulder between the non-threaded portion and the threaded portion of the shaft;
      a spring disposed concentrically about the non-threaded portion of the shaft, the first end of the spring contacting a front surface of the second plate and the second end of the spring contacting the shaft shoulder, the spring acting to urge the plates apart; and
      the scale located on an exterior surface of the second plate, the scale having a zero point and a series of indicators corresponding to a weight being measured by the weight measurement system.

46. The trailer tongue weight measurement system of claim 45, further comprising a handle connected to the shaft, the handle being located over the scale, wherein rotation of the handle causes rotation of the shaft and either compression or release of the spring.

47. The trailer tongue weight measurement system of claim 46, wherein the trailer tongue weight measurement system is calibrated such that in a loaded condition, the zero point on the scale is located under the handle and the handle is rotated until the one or more clearance indicators are free to move, the position of the handle over the scale when the clearance indicators are free to move indicating the weight on the trailer tongue.

48. The trailer weight measurement system of claim 26, wherein the threaded hole in the first plate further comprises a nut having a threaded through hole, the nut being positioned so that the nut through hole is concentric over the shaft hole in the first plate, the nut connected to a front surface of the front plate.

* * * * *